United States Patent
Bhatia et al.

(10) Patent No.: US 10,841,233 B2
(45) Date of Patent: Nov. 17, 2020

(54) DATA PLANE FOR PROCESSING FUNCTION SCALABILITY

(71) Applicant: ALCATEL-LUCENT USA INC., Murray Hill, NJ (US)

(72) Inventors: Randeep S. Bhatia, Green Brook, NJ (US); Fang Hao, Morganville, NJ (US); Tirunell V. Lakshman, Morganville, NJ (US); Harish Viswanathan, Morristown, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 0 days.

(21) Appl. No.: 15/848,277

(22) Filed: Dec. 20, 2017

(65) Prior Publication Data

US 2018/0115494 A1  Apr. 26, 2018

Related U.S. Application Data

(63) Continuation of application No. 14/985,652, filed on Dec. 31, 2015, now Pat. No. 9,906,460.

(51) Int. Cl.
| | |
|---|---|
| *H04L 12/863* | (2013.01) |
| *H04L 12/26* | (2006.01) |
| *H04L 12/741* | (2013.01) |
| *H04L 12/825* | (2013.01) |
| *H04L 12/835* | (2013.01) |
| *H04L 12/861* | (2013.01) |
| *H04L 12/823* | (2013.01) |
| *H04L 12/715* | (2013.01) |

(52) U.S. Cl.
CPC ............ *H04L 47/626* (2013.01); *H04L 43/16* (2013.01); *H04L 45/745* (2013.01); *H04L 47/25* (2013.01); *H04L 47/30* (2013.01); *H04L 49/9084* (2013.01); *H04L 45/64* (2013.01); *H04L 47/32* (2013.01); *H04L 49/9036* (2013.01)

(58) Field of Classification Search
CPC ....... H04L 47/626; H04L 47/30; H04L 47/25; H04L 47/32
See application file for complete search history.

(56) References Cited

U.S. PATENT DOCUMENTS

| | | | |
|---|---|---|---|
| 2010/0106816 A1 | 4/2010 | Gulati et al. | |
| 2011/0170455 A1* | 7/2011 | Cai | ...................... H04L 12/1403 370/259 |
| 2014/0269319 A1 | 9/2014 | DeCusatis et al. | |

(Continued)

FOREIGN PATENT DOCUMENTS

EP    0 491 489 A2    6/1992

OTHER PUBLICATIONS

Awerbuch et al., "Improved Approximation Algorithms for the Multi-Commodity Flow Problem and Local Competitive Routing in Dynamic Networks," ACM, Dec. 31, 1994, pp. 487-496.

(Continued)

*Primary Examiner* — Feben Haile
(74) *Attorney, Agent, or Firm* — Tong, Rea, Bentley & Kim, LLC

(57) ABSTRACT

The present disclosure generally discloses a data plane configured for processing function scalability. The processing functions for which scalability is supported may include charging functions, monitoring functions, security functions, or the like.

13 Claims, 12 Drawing Sheets

(56) References Cited

U.S. PATENT DOCUMENTS

| | | | |
|---|---|---|---|
| 2014/0348030 A1* | 11/2014 | Tornkvist | H04L 12/1435 370/259 |
| 2015/0006770 A1 | 1/2015 | Shumsky et al. | |
| 2016/0037411 A1* | 2/2016 | Franklin | H04W 36/24 370/331 |
| 2018/0262930 A1* | 9/2018 | da Silva | H04L 12/1403 |

OTHER PUBLICATIONS

International Search Report and Written Opinion of corresponding PCT Application No. PCT/US2016/067876, dated Apr. 18, 2017, 14 pages.

* cited by examiner

DATA PLANE FOR PROCESSING FUNCTION SCALABILITY

CROSS-REFERENCE TO RELATED APPLICATIONS

This application is a continuation of U.S. patent application Ser. No. 14/985,652, filed on Dec. 31, 2015, entitled DATA PLANE FOR PROCESSING FUNCTION SCALABILITY, which is hereby incorporated herein by reference.

TECHNICAL FIELD

The disclosure relates generally to wireless communication networks and, more specifically but not exclusively, to supporting scalability of functions in wireless communication networks.

BACKGROUND

Third Generation (3G) and Fourth Generation (4G) wireless networks currently support large numbers of end devices and significant amounts of associated end user traffic. With the advent of new types of communication technologies and paradigms, Fifth Generation (5G) wireless networks and beyond are expected to support increasing numbers of end devices and increasing amounts of associated end user traffic. For example, 5G wireless networks are expected to support large numbers of end devices and increases in associated end user traffic as new communication technologies and paradigms, such as the Internet of Things (IoT) and machine-to-machine (M2M) communications become more ubiquitous.

SUMMARY

The present disclosure generally discloses mechanisms for providing a data plane configured for processing function scalability.

In at least some embodiments, an apparatus is configured to support a data plane portion of a processing function supported by a forwarding element and a control element in a communication network. The apparatus includes a first storage element configured to maintain a packet buffer data structure configured to store packet data for a set of data packets, wherein the packet buffer data structure includes a packet queue configured to store packet data and a packet aggregation buffer configured to store packet data on a per-flow basis. The apparatus includes a second storage element configured to store flow data for a set of data flows for which the forwarding element supports packet forwarding. The apparatus includes a processor element that is communicatively connected to the first storage element and the second storage element. The processor element is configured to receive, from a hardware element of the forwarding element, a first packet header of a first packet and a second packet header of a second packet. The processor element is configured to determine first packet data associated with the first packet. The processor element is configured to store the first packet data in the packet queue of the packet buffer data structure, as individual packet data for the first packet, based on a determination that the packet queue is below a threshold. The processor element is configured to determine second packet data associated with the second packet. The processor element is configured to store the second packet data in the packet aggregation buffer of the packet buffer data structure based on a determination that the packet queue exceeds the threshold.

In at least some embodiments, an apparatus is configured to support a data plane portion of a processing function supported by a forwarding element and a control element in a communication network. The apparatus includes a first storage element configured to maintain a packet buffer data structure configured to store packet data for a set of data packets, wherein the packet buffer data structure includes a packet queue configured to store packet data and a packet aggregation buffer configured to store packet data on a per-flow basis. The apparatus includes a second storage element configured to store flow data for a set of data flows for which the forwarding element supports packet forwarding. The apparatus includes a processor element that is communicatively connected to the first storage element and the second storage element. The processor element is configured to extract, from the packet queue of the first memory element, a packet data entry comprising packet data, wherein the packet data comprises individual packet data for one of the data flows or aggregated packet data for one of the data flows. The processor element is configured to determine flow data for the one of the data flows based on the packet data of the packet data entry. The processor element is configured to store the flow data for the one of the data flows in the second memory element. The processor element is configured to propagate the flow data for the one of the data flows toward the control element.

In at least some embodiments, an apparatus is configured to support a data plane portion of a processing function supported by a forwarding element and a control element in a communication network. The apparatus includes a storage element configured to maintain a first data structure and a second data structure. The first data structure is configured to store packet data for a set of data packets. The first data structure includes a packet queue configured to store packet data and a packet aggregation buffer configured to store packet data on a per-flow basis. The second data structure is configured to store flow data for a set of data flows for which the forwarding element supports packet forwarding. The apparatus includes a processor element that is communicatively connected to the storage element. The processor element is configured to receive, from a hardware element of the forwarding element, a packet header of a packet, wherein the packet is associated with a data flow. The processor element is configured to determine packet data associated with the packet. The processor element is configured to store the packet data in the packet queue of the first data structure, rather than in the packet aggregation buffer of the first data structure, based on a determination that a size of the packet queue does not exceed a threshold. The processor element is configured to extract the packet data from the packet queue of the first data structure. The processor element is configured to determine, based on the packet data, flow data for the data flow. The processor element is configured to store, in the second data structure, the flow data for the data flow. The processor element is configured to propagate, toward the control element, the flow data for the data flow.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure generally discloses a data plane configured to support processing function scalability. The processing function scalability may be provided for a processing function of a communication network. The processing function of the communication network may be implemented within the communication network using a data plane portion of the processing function and a control plane portion of the processing function, where the data plane portion of the processing function and the control plane portion of the processing function may cooperate to provide the processing function for the communication network. The data plane portion of the processing function, as indicated above, is configured to support scalability of the processing function within the communication network. The processing functions for which processing function scalability may be supported may include charging functions, monitoring functions, security functions, or the like. It will be appreciated that, although primarily presented within the context of wireless communication networks, various embodiments of the data plane configured for processing function scalability may be used in various other types of communication networks or environments.

Figure 1:
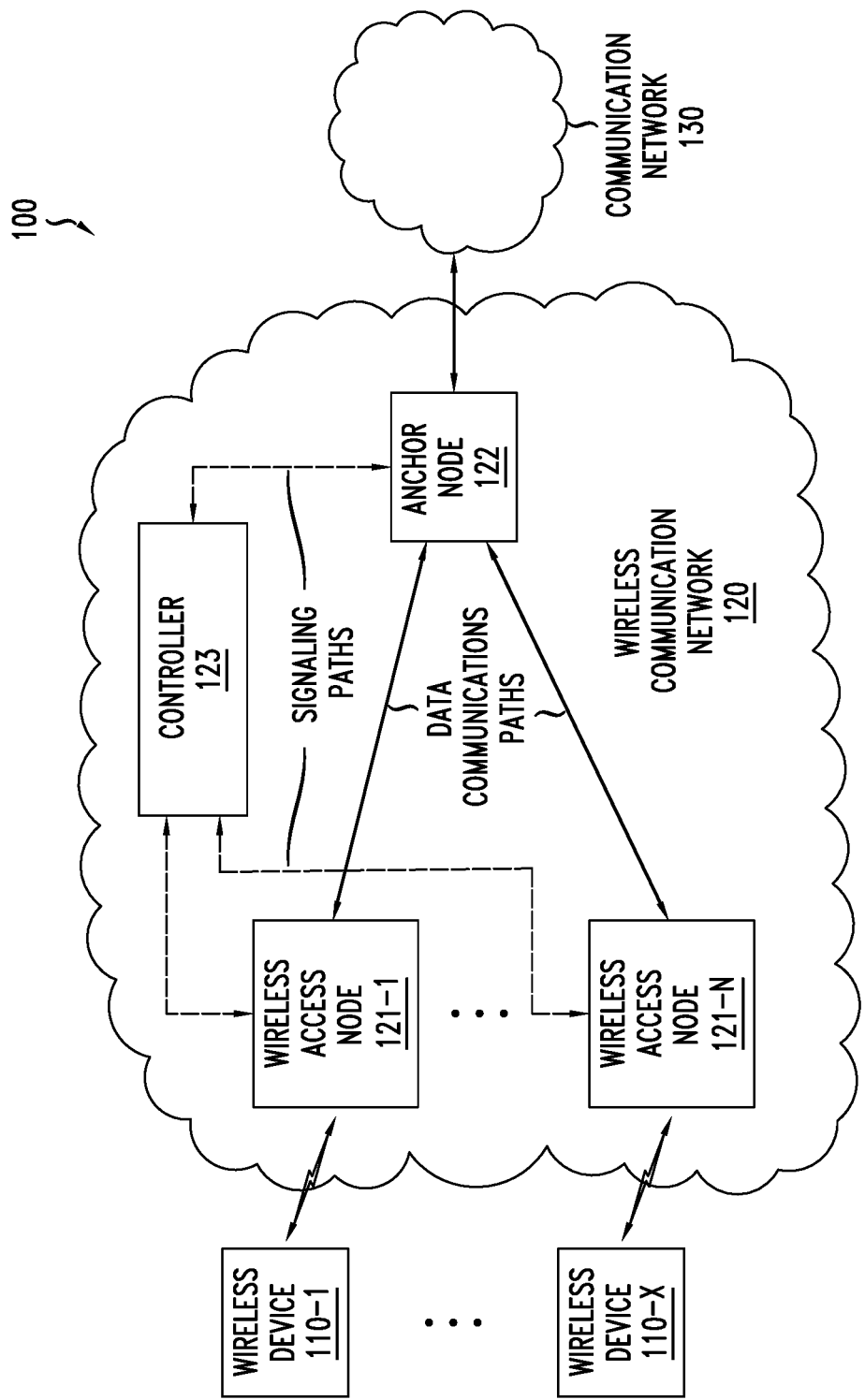
FIG. 1 depicts an exemplary wireless communication system including a data plane configured to support function scalability.

FIG. 1 depicts an exemplary wireless communication system including a data plane configured to support function scalability.

The wireless communication system 100 may be based on any suitable wireless system technology. For example, wireless communication system 100 may be a Third Generation (3G) wireless systems (e.g., a Universal Mobile for Telecommunication Systems (UMTS) or other 3G wireless system), a Fourth Generation (4G) wireless system (e.g., a Long Term Evolution (LTE) or other 4G wireless system), a Fifth Generation (5G) wireless system, or the like.

The wireless communication system 100 includes a plurality of wireless devices (WDs) 110-1-110-X (collectively, WDs 110), a wireless communication network (WCN) 120, and a communication network (CN) 130.

The WDs 110 include wireless devices configured to wirelessly access WCN 120 and to communicate via WCN 120. For example, the WDs 110 may include end user devices (e.g., smartphones, tablet computers, laptop computers, or the like). For example, the WDs 110 may include Internet-of-Things (IoT) devices (e.g., sensors, monitors, actuators, controllers, or the like) which may be deployed for various IoT applications. For example, IoT applications may include consumer products (e.g., health and fitness products, gaming, or the like, smart home applications (e.g., devices controlling lighting, temperature, appliances, communication systems, security devices, entertainment device, or the like), environmental monitoring applications (e.g., sensors assisting in environmental protection, monitors for monitoring the movements of wildlife, sensors for earthquake and tsunami early warning systems, or the like), infrastructure management applications (e.g., monitors and sensors for monitoring urban and rural infrastructure), energy management applications (e.g., sensor and controllers for smart-grid technology and other types of energy management), manufacturing applications (e.g., sensors for providing automated controls, plant optimization, health and safety management, or the like), commercial building automation applications (e.g., devices controlling lighting, temperature, appliances, communication systems, security devices, or the like), healthcare applications (e.g., wearable medical devices for patient tracking, health monitoring or the like), or the like. The WDs 110 may include various other types of wireless devices which may access WCN 120 and communicate via WCN 120.

The WCN 120 is configured to support communications between WDs 110 and CN 130. The WCN 120 includes a set of wireless access nodes (WANs) 121-1-121-N (collectively, WANs 121), an anchor node (AN) 122, and a controller 123. As depicted in FIG. 1, the WANs 121 and the AN 122 are configured to communicate via data communication paths which it will be appreciated, although omitted for purposes of clarity, may include various network elements (e.g., switches, routers, or the like), communication links, or the like, as well as various combinations thereof. As further depicted in FIG. 1, the controller 123 is configured to communicate with the WANs 121 and the AN 122 via signaling paths which it will be appreciated, although omitted for purposes of clarity, may include various network elements (e.g., switches, routers, or the like), communication links, or the like, as well as various combinations thereof. It will be appreciated that WCN 120 may include various other elements (omitted for purposes of clarity) and may support various other types of communications. The WCN 120 is configured to support processing function associated with supporting communications by WDs 110 via WCN 120, such as charging functions, monitoring functions, security functions, or the like, as well as various combinations thereof.

The WANs 121 are configured to operate as wireless points of access to the WCN 120 for the WDs 110. The WANs 121 may be configured to support network attach procedures by which WDs 110 attach to WCN 120. The WANs 121 may be configured to support communications between WDs 110 and controller 123 in order to enable WDs 110 to attach to WCN 120. The WANs 121 may be configured to support wireless communications of WDs 110, including wireless uplink transmission from WDs 110 and wireless downlink transmissions to WDs 110. The WANs 121 may be configured to support backhaul communications between WANs 121 and AN 122 (and, thus, CN 130). The WANs 121 may be configured to provide various other functions. For example, WANs 121 may include 3G UMTS NodeBs, 4G LTE Evolved NodeBs (eNodeBs), 5G base transceiver stations (BTSs), small-cell radio access points (e.g., femtocells, picocells, microcells, or the like), or the like. The functions typically supported by the wireless access nodes of a wireless communication network (such as the WANs 121 of the WCN 120) will be understood by one skilled in the art. The WANs 121 may be configured to support a data plane portion(s) of a processing function(s) supported by WCN 120 (e.g., providing data plane processing functions in support of a charging function of WCN 120, providing data plane processing functions in support of a monitoring function of WCN 120, providing data plane processing functions in support of a security function of WCN 120, or the like, as well as various combinations thereof).

The AN 122 is configured to operate as a mobility anchor and network-layer anchor (e.g., an IP anchor point) for the WDs 110 communicating via the WCN 120. The AN 122 may be configured to operate as a gateway between WCN 120 and CN 130, supporting communication of packets between WCN 120 and CN 130. For upstream communications from WDs 110 toward CN 130, the AN 122 is configured to direct received packets toward the CN 130. For downstream communications from CN 130 toward WDs 110, the AN 122 is configured to receive from the CN 130 packets intended for delivery to a given WD 110, identify the WAN 121 via which the given WD 110 is currently attached, and forward the packets toward the WAN 121 via which the given WD 110 is currently attached for delivery to the given WD 110. For example, where WCN 120 is a 3G UMTS network, the AN 122 may be a Gateway General Packet Radio Service (GPRS) Support Node (GGSN), a combined GGSN and Serving GPRS Support Node (SGSN), or the like. For example, where WCN 120 is a 4G LTE network, the AN 122 may be a Packet Data Network (PDN) Gateway (PGW), a combined PGW and Serving Gateway (SGW), or the like. For example, where WCN 120 is a 5G wireless network, the AN 122 may be a 5G switch (e.g., supporting at least some functions typically supported by an LTE PGW or PGW/SGW combination) or other suitable type of 5G anchor device. The functions typically supported by the anchor node of a wireless communication network (such as the AN 122 of the WCN 120) will be understood by one skilled in the art. The AN 122 may be configured to support a data plane portion(s) of a processing function(s) supported by WCN 120 (e.g., providing data plane processing functions in support of a charging function of WCN 120, providing data plane processing functions in support of a monitoring function of WCN 120, providing data plane processing functions in support of a security function of WCN 120, or the like, as well as various combinations thereof).

The controller 123 is configured to provide various control functions for WCN 120. The controller 123 is configured to communicate with the WANs 121 and the AN 122 for purposes of providing control functions in support of processing functions for the WCN 120. For example, the controller 123 may provide control functions in support of processing functions such as network attachment (e.g., authentication and authorization), monitoring, security, charging, or the like, as well as various combinations thereof. It is noted that the controller 123 may support at least some such processing functions based on interaction with WANs 121 and AN 122 (e.g., based on information received from at least some of these elements, by providing information to at least some of these elements, or the like, as well as various combinations thereof). For example, where the WCN 120 is a 3G UMTS network, controller 123 may include one or more of Home Subscriber Server (HSS) functions, Visitor Location Register (VLR) functions, or the like. For example, where the WCN 120 is a 4G LTE network, the controller 123 may include one or more of Mobility Management Entity (MME) functions, Packet Charging and Rules Function (PCRF) functions, or the like. For example, where the WCN 120 is a 5G wireless network, the controller 123 may include one or more of MME functions or other similar mobility management functions, PCRF functions or other similar charging and rules functions, or the like. The controller 123 may be configured to provide various other control functions within WCN 120. The controller 123 may be configured to support a control plane portion(s) of a processing function(s) supported by WCN 120 (e.g., providing control plane processing functions in support of a charging function of WCN 120, providing control plane processing functions in support of a monitoring function of WCN 120, providing control plane processing functions in support of a security function of WCN 120, or the like, as well as various combinations thereof).

The WCN 120 may be implemented in various ways using various types of technologies. The WCN 120 may be implemented using various communication and control capabilities or technologies. The WCN 120 may be implemented using underlying signaling and control capabilities based on the type of wireless technology of WCN 120 (e.g., underlying signaling and control capabilities of a 3G UMTS network, underlying signaling and control capabilities of a 4G LTE network, underlying signaling and control capabilities of a 5G wireless network, or the like). The WCN 120 may be implemented using a distributed architecture in which the data plane and control plane are separated using one or more forwarding elements (FEs) that are controlled by one or more associated control elements (CEs). In at least some such embodiments, for example, the WANs 121 and the AN 122 may be the FEs and the controller 123 may be the CE. In at least some such embodiments, for example, WCN 120 may be implemented using Software Defined Networking (SDN), in which case the controller 123 is configured to operate as an SDN controller and other elements of WCN 120 (namely, WANs 121, AN 122, and, optionally, other elements of WCN 120 which have been omitted for purposes of clarity) are configured to operate as SDN network devices. In at least some embodiments in which WCN 120 is implemented using SDN, SDN-based communication may be implemented using OpenFlow (or any other suitable communication protocol). In at least some embodiments, WCN 120 may be implemented using Network Function Virtualization (NFV), such as where elements of the WCN 120 are implemented within a virtualization environment (e.g., within a datacenter environment or other suitable type of environment). The WCN 120 may be implemented using various other types of technologies.

The CN 130 may include any communication network via which WDs 110 may communicate. For example, the CN 130 may include one or more public data networks (e.g., the Internet), one or more private data networks (e.g., one or more of one or more network operator networks, one or more service provider networks, one or more enterprise networks, one or more cloud networks, or the like), or the like, as well as various combinations thereof.

It will be appreciated that, although primarily presented herein as having particular elements arranged in a particular configuration, wireless communication system 100 may have various other elements which may be arranged in various other configurations.

Figure 2:
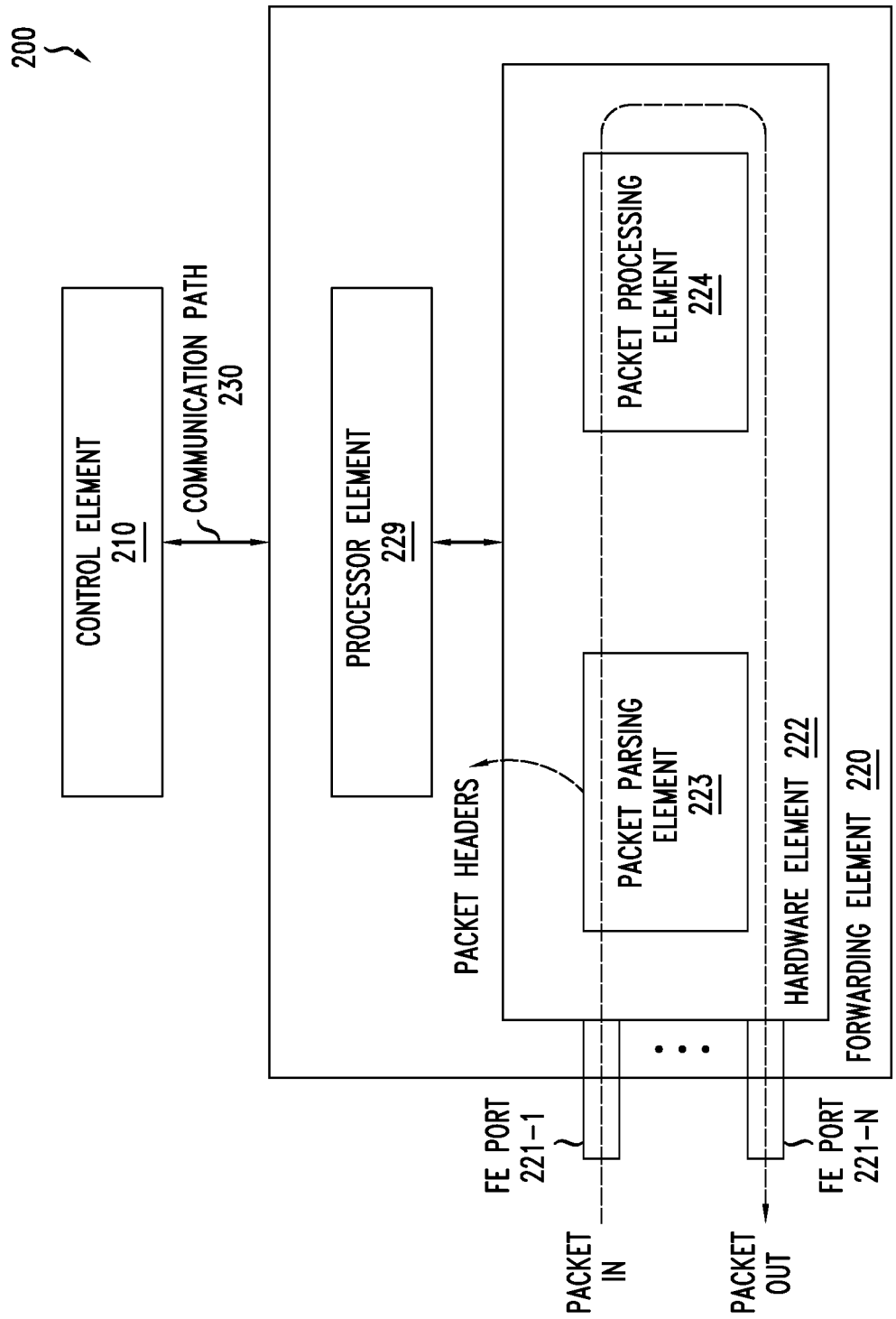
FIG. 2 depicts an exemplary distributed architecture, for a wireless communication system, including a control element and including a forwarding element providing or supporting a data plane for processing function scalability.

FIG. 2 depicts an exemplary distributed architecture, for a wireless communication system, including a control element and including a forwarding element providing or supporting a data plane for processing function scalability.

As depicted in FIG. 2, distributed architecture 200 includes a control element (CE) 210 and a forwarding element (FE) 220, where the CE 210 and the FE 220 are communicatively connected via a communication path 230.

The CE 210 and FE 220 may correspond to elements of a wireless communication system (e.g., wireless communication system 100 of FIG. 1) and may cooperate to provide various processing functions supported by the wireless communication system. For example, the CE 210 may correspond to the controller 123 of WCN 120 of FIG. 1 and the FE 220 may correspond to any element in the data plane of WCN 120 (e.g., a WAN 121, AN 122, or the like). For example, as discussed herein, CE 210 and FE 220 may cooperate to provide processing functions such as monitoring, security, charging, or the like, as well as various combinations thereof. It will be appreciated that, although only a single CE 210 and a single FE 220 are depicted (for purposes of clarity), multiple CEs may be used, multiple FEs may be used, or the like, as well as various combinations thereof.

The CE 210 is configured to provide control plane functions for the wireless communication network in which the CE 210 is deployed (e.g., HSS and VLR functions in a 3G UMTS network, MME and PCRF functions in a 4G LTE network or a 5G wireless network, or the like). The CE 210 is configured to provide control plane functions for the processing functions (e.g., charging, monitoring, security, or the like) supported for the wireless communication network.

The FE 220 is configured to provide data plane functions for the wireless communication network in which the FE 220 is deployed (e.g., GGSN and SGSN functions in a 3G UMTS network, PGW and SGW functions in a 4G LTE network or a 5G wireless network, or the like). The FE 220, as discussed further below, is configured to provide or support data plane functions for the processing functions (e.g., charging, monitoring, security, or the like) supported for the wireless communication network. The data plane functions supported by the FE 220, for the processing functions that are supported for the wireless communication network, may be configured to support the corresponding control plane functions supported by the CE 210 for the processing functions (e.g., providing particular types of information that may be required by or useful to the CE 210 in providing the control plane functions supported by the CE 210 for the processing functions). The FE 220 may be configured to provide or support data plane functions, for the processing functions supported for the wireless communication network, in a manner that supports scalability of the processing functions supported for the wireless communication network.

The FE 220 includes a set of FE ports 221-1-221-N (collectively, FE ports 221) a hardware element 222, and a processor element 229. The FE ports 221, which are communicatively connected to the hardware element 222, support reception and transmission of data packets by FE 220 in the data plane of the wireless communication network. The hardware element 222 and processor element 229 may cooperate to support reception and transmission of data packets by FE 220 in the data plane of the wireless communication network.

The hardware element 222 is configured to support communication of data packets in the data plane of the wireless communication network. The hardware element 222 includes a packet parsing element 223 and a packet processing element 224. The FE 220 receives a data packet via one of the FE ports 221 and provides the data packet to the packet parsing element 223. The packet parsing element 223 parses the data packet to identify a data flow of the data packet. The packet parsing element 223 may identify the data flow to which the data packet belongs based on any suitable combination of header fields of the data packet (e.g., based on a 4-tuple, a 5-tuple, or the like). The packet parsing element 223 provides the data packet to the packet processing element 224. The packet processing element 224 receives the data packet and processes the data packet based on the identified data flow of the data packet. The packet processing element 224 maintains, or has access to, a flow table that maintains flow handling information on a per-flow basis (e.g., packet processing rules, packet forwarding rules, or the like, as well as various combinations thereof). The packet processing element 224 may determine forwarding of the packet via a particular FE port 221 based on a flow table entry associated with the identified data flow of the data packet. The packet parsing element 223 and the packet processing element 224 may interact with processor element 229 to provide the packet parsing and processing functions, respectively. The packet processing element 224 provides the data packet to one of the FE ports 221 for transmission from the FE 220. The hardware element 222 may be any type of hardware element suitable for providing the packet parsing element 223 and the packet processing element 224 of FE 220 (e.g., an Application Specific Integrated Circuit (ASIC) or other suitable type of hardware element). It will be appreciated that the hardware element 222 of FE 220 may provide various other functions in support of reception and transmission of data packets by FE 220 in the data plane of the wireless communication network.

The processor element 229 is configured to support communication of data packets in the data plane of the wireless communication network. The processor element 229 is configured to provide programmatic control over packet forwarding performed by the hardware element 222. The processor element 229 may be configured to provide programmatic control over packet forwarding performed by the hardware element 222 based on interaction with CE 210. For example, where the hardware element 222 does not have a flow table entry for a data flow of a data packet received by hardware element 222, processor element 229 may request a flow table entry for the data packet from CE 210 on behalf of FE 220, receive the flow table entry for the data packet from the CE 210, and install the flow table entry on hardware element 222 for use by the hardware element 222 in forwarding the data packet and other data packets of the data flow. The processor element 229 may be any type of processing element suitable for supporting the hardware element 222 of FE 220 (e.g., a Central Processing Unit (CPU) or other suitable type of processing element). It will be appreciated that the processor element 229 of the FE 220 may provide various other functions in support of reception and transmission of data packets by FE 220 in the data plane of the wireless communication network.

The FE 220, as discussed herein, is configured to provide or support data plane functions for the processing functions (e.g., charging, monitoring, security, or the like) supported for the wireless communication network. In at least some embodiments, as presented and discussed further below with respect to FIG. 3, the processor element 229 of the FE 220 is configured to provide the data plane functions based on packet headers received by the processor element 229 from the hardware element 222 (i.e., FE 220 provides the data plane functions for the processing functions supported for the wireless communication network). In at least some embodiments, as presented and discussed further below with respect to FIG. 4, an adjunct element associated with the FE 220 (which is omitted from FIG. 2 for purposes of clarity) is configured to support the data plane functions based on packet headers received by the adjunct element from the hardware element 222 (i.e., FE 220 supports the data plane functions for the processing functions supported for the wireless communication network). In either case, FE 220 is configured to support propagation of packet headers of data packets for use in providing or supporting the data plane functions for the processing functions supported for the wireless communication network.

The hardware element 222 of the FE 220, as discussed above, is configured to support propagation of packet headers of data packets for use in providing or supporting the data plane functions for the processing functions supported for the wireless communication network. As depicted in FIG. 2, packet parsing element 223 of hardware element 222 may be configured to extract the packet headers from the data packets and to propagate the packet headers for delivery to elements providing the data plane functions for the processing functions supported for the wireless communication network, such as to the processor element 229 of FE 220 as in FIG. 3 or to the adjunct element associated with FE 220 as in FIG. 4.

The hardware element 222 of the FE 220, as discussed above, is configured to support propagation of packet headers of data packets for use in providing or supporting the data plane functions for the processing functions supported for the wireless communication network. In at least some embodiments, the packet headers of the packets may be propagated from the hardware element 222 in their original form. In at least some embodiments, the packet headers of the packets may be compressed by the hardware element 222 prior to being propagated. The compression of packet headers may significantly reduce the amount of data that is transferred from the hardware element 222 to the element providing the data plane functions for the processing functions supported for the wireless communication network (e.g., processor element 229 or an adjunct element). The packet header compression may be performed using any suitable compression techniques (e.g., Robust Header Compression (ROHC), stateless dictionary-based compression, or the like). For example, ROHC may be used by the hardware element 222 to compress packet headers. It is noted that, while ROHC can reduce the IP packet header from forty bytes (for IPv4) to one to three bytes, implementing ROHC typically requires maintaining per-flow state information in the hardware (which can be significant for flows of all sizes, even for relatively small flows such as those that are approximately 100K or less). For example, stateless dictionary based compression may be used by the hardware element 222 to compress packet headers. In stateless dictionary based compression, the hardware element 222 builds and shares (with the element that is providing the data plane functions for the processing functions supported for the wireless communication network and, thus, is receiving the packet headers of the packets) a dictionary of header field values that are used for compression (e.g., mappings of values of the header fields to smaller sized dictionary values), the hardware element 222 compresses the packet headers based on the dictionary of header field values by replacing the header field values of the packet headers with the corresponding smaller sized dictionary values, and the element that receives the compressed packet headers uses the dictionary of header field values to reconstruct the original packet headers from the compressed packet headers by replacing the smaller sized dictionary values of the compressed packet headers with the corresponding header field values. In stateless dictionary based compression, the maximum number of entries in the dictionary of header field values can be limited to fit the available space in the hardware element, and the dictionary of header field values may be dynamically updated as new flows arrive in the system. It will be appreciated that other packet header compression techniques may be used.

The hardware element 222 of the FE 220, as discussed above, is configured to support propagation of packet headers of data packets for use in providing or supporting the data plane functions for the processing functions supported for the wireless communication network. The hardware element 222 may propagate the packet headers, for delivery to the element providing the data plane functions for the processing functions supported for the wireless communication network, using any suitable communication channel(s) or path(s), which may vary depending on whether the data plane functions for the processing functions are provided on the FE 220 or by an adjunct element associated with the FE 220. For example, the hardware element 222 may propagate the packet headers using dedicated FE ports (e.g., one or more of the FE ports 221), using a communication bus (e.g., a Peripheral Component Interconnect (PCI) bus, a PCI Express (PCIe) bus, or the like), or the like, as well as various combinations thereof. The hardware element 222 may be configured to stream the packet headers to the element providing the data plane functions for the processing functions supported for the wireless communication network.

The hardware element 222, as discussed above, is configured to support propagation of packet headers of data packets to an element that is providing the data plane functions for the processing functions supported for the wireless communication network. This may obviate the need for the FE 220 to track various types of flow data (e.g., statistics, state information, or the like), associated with providing such processing functions supported for the wireless communication network, in the process of forwarding packets. This also may obviate the need for the FE 220 to add additional flow table entries to the flow table (e.g., a separate flow table entry for each individual flow) solely for the purposes of supporting processing functions for the wireless communication network, which can be quite inefficient. For example, typically, only a limited number of flow table entries can be maintained within the FE hardware (e.g., in Ternary Content-Addressable Memory (TCAM) or Static Random Access Memory (SRAM)). This may be especially true for SDN-enabled switches, as compared with traditional L2/L3 switches, since, currently, SDN-enabled switches typically cannot exceed 10K entries in the TCAM as SDN allows packet matches over a much larger number of packet fields than traditional L2/L3 switches. As a result, in existing SDN switches, supporting even a relatively small number of flows with a TCAM flow entry for each flow can be challenging. Additionally, it is noted that, at larger flow table sizes, the FE hardware (e.g., TCAM/SRAM) cost and power consumption increase rapidly.

It will be appreciated that FE 220 may include various other capabilities configured to provide or support data plane functions for the processing functions (e.g., charging, monitoring, security, or the like) supported for the wireless communication network.

It will be appreciated that CE 210 and FE 220 may be configured to provide various other functions within the wireless communication network.

Figure 3:
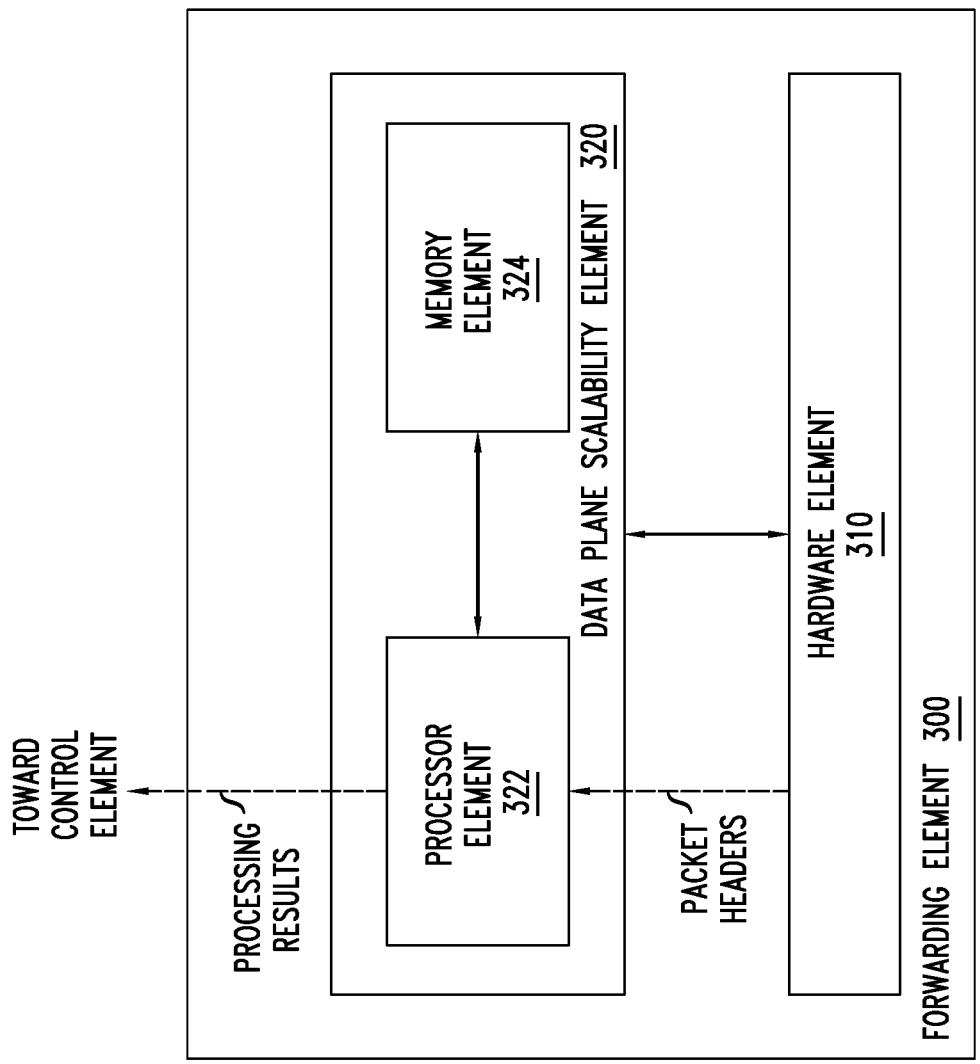
FIG. 3 depicts an embodiment of a data plane for processing function scalability in which the data plane is provided by the forwarding element.

FIG. 3 depicts an embodiment of a data plane for processing function scalability in which the data plane is provided by the forwarding element. As depicted in FIG. 3, the data plane for processing function scalability is provided within an FE 300. The FE 300 may be used as FE 220 of FIG. 2. The FE 300 includes a hardware element 310 and a data plane scalability element 320. The hardware element 310 may be configured to operate in a manner similar to the hardware element 222 of the FE 220 of FIG. 2. The data plane scalability element 320 includes a processor element 322 and a memory element 324. The processor element 322 may be a modified version of processor element 229 of the FE 220 of FIG. 2 (as depicted in FIG. 3) or may be an additional processor element that is configured for communication with processor element 229 of the FE 220 of FIG. 2 (which embodiment has been omitted from FIG. 3 for purposes of clarity). The processor element 322 and the memory element 324 cooperate to provide a data plane (e.g., data plane functions), for the processing functions (e.g., charging, monitoring, security, or the like) supported for the wireless communication network, in a manner that supports scalability of the processing functions supported for the wireless communication network (e.g., scalability of charging functions, scalability of monitoring functions, scalability of security functions, or the like, as well as various combinations thereof). The processor element 322 receives data packet headers from hardware element 310 (e.g., from a packet parsing element, such as the packet parsing element 223 of FIG. 2). The processor element 322 performs data plane processing functions, based on the packet headers, in support of the processing functions supported for the wireless communication network (e.g., data plane processing in support of charging, data plane processing in support of monitoring, data plane processing in support of security, or the like). The processor element 322 propagates, toward a CE (e.g., the CE 210 of FIG. 2), processing results from the data plane processing performed by the processor element 322. The processor element 322 may include any suitable type of processor element (e.g., a CPU or other suitable processor element). The memory element 324 may include any suitable type of memory-based storage element (e.g., a Random Access Memory (RAM), a Dynamic RAM (DRAM), a Synchronous DRAM (SDRAM), or the like). An exemplary embodiment of data plane scalability element 320 is depicted and described with respect to FIG. 5.

Figure 4:
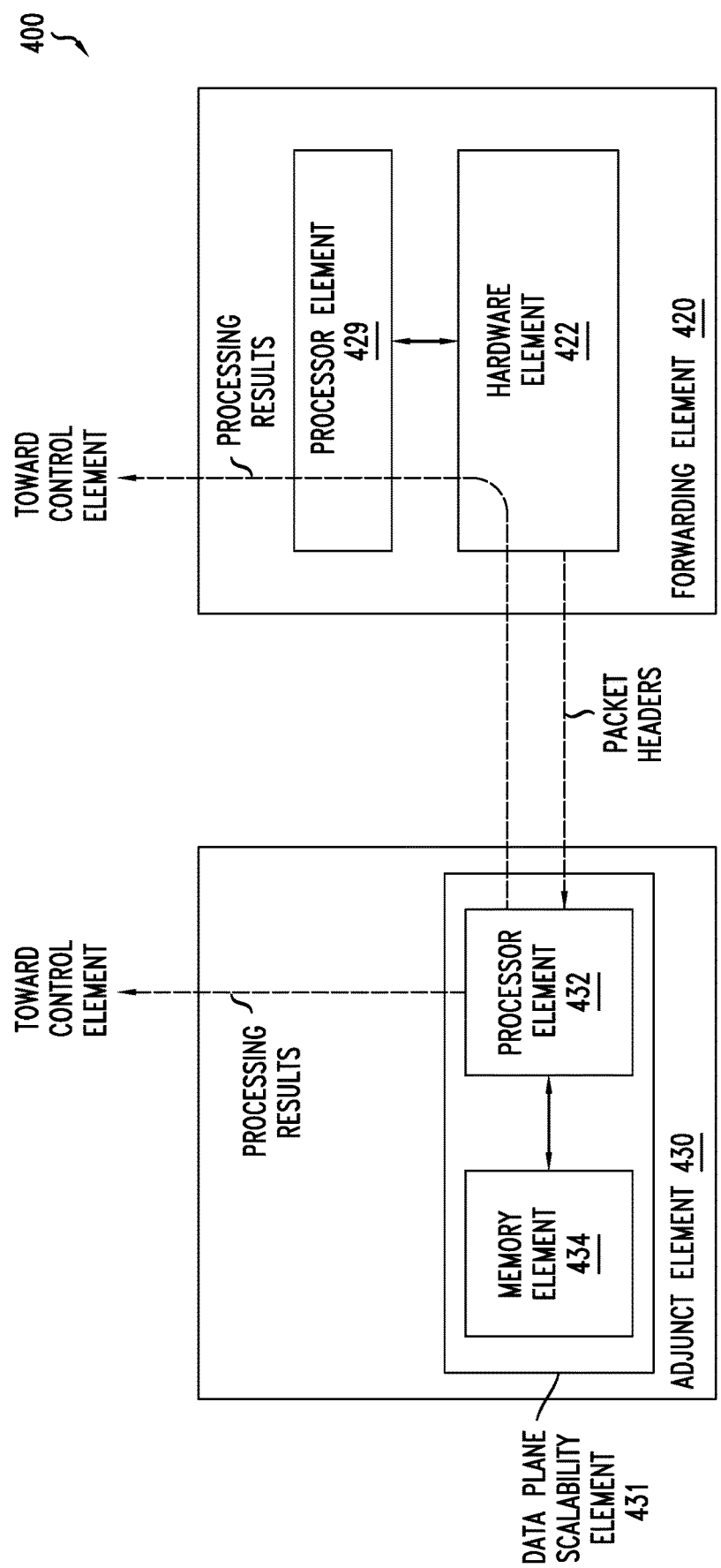
FIG. 4 depicts an embodiment of a data plane for processing function scalability in which the data plane is provided by the forwarding element and by an adjunct element associated with the forwarding element.

FIG. 4 depicts an embodiment of a data plane for processing function scalability in which the data plane is provided by the forwarding element and by an adjunct element associated with the forwarding element. As depicted in FIG. 4, the data plane for processing function scalability is provided by a system 400 including an FE 420 and an adjunct element (AE) 430. The FE 420 may be used as FE 220 of FIG. 2. The FE 420 includes a hardware element 422 and a processor element 429, which may be configured in a manner similar to hardware element 222 and processor element 229 of FE 220 of FIG. 2, respectively. The AE 430 includes a data plane scalability element 431 that is configured to provide the data plane for processing function scalability. The data plane scalability element 431 includes a processor element 432 and a memory element 434. The processor element 432 and the memory element 434 cooperate to provide a data plane (e.g., data plane functions), for the processing functions (e.g., charging, monitoring, security, or the like) supported for the wireless communication network, in a manner that supports scalability of the processing functions supported for the wireless communication network (e.g., scalability of charging functions, scalability of monitoring functions, scalability of security functions, or the like, as well as various combinations thereof). The processor element 432 receives data packet headers from FE 420 (e.g., from hardware element 422). The processor element 432 may receive the packet headers from FE 420 via FE ports of FE 420 (e.g., such as FE ports 221) or via any other suitable communication channel between FE 420 and AE 430. The processor element 432 performs data plane processing functions, based on the packet headers, in support of the processing functions supported for the wireless communication network (e.g., data plane processing in support of charging, data plane processing in support of monitoring, data plane processing in support of security, or the like). The processor element 432 propagates, toward a CE (e.g., the CE 210 of FIG. 2), processing results from the data plane processing performed by the processor element 432. The processor element 432 may propagate the processing results toward the CE directly without traversing the FE 420 or indirectly via the FE 420. The processor element 432 may propagate the processing results toward the CE indirectly via the FE 420 by providing the processing results to the processor element 429 of FE 420 (e.g., via the FE ports of FE 420 (e.g., such as FE ports 221)) which then propagates the processing results toward the CE. The AE 430 may be a server or other suitable types of device. The processor element 432 may include any suitable type of processor element (e.g., a CPU or other suitable processor element). The memory element 434 may include any suitable type of memory-based storage element (e.g., a RAM, a DRAM, an SDRAM, or the like). An exemplary embodiment of data plane scalability element 431 is depicted and described with respect to FIG. 5.

Figure 5:
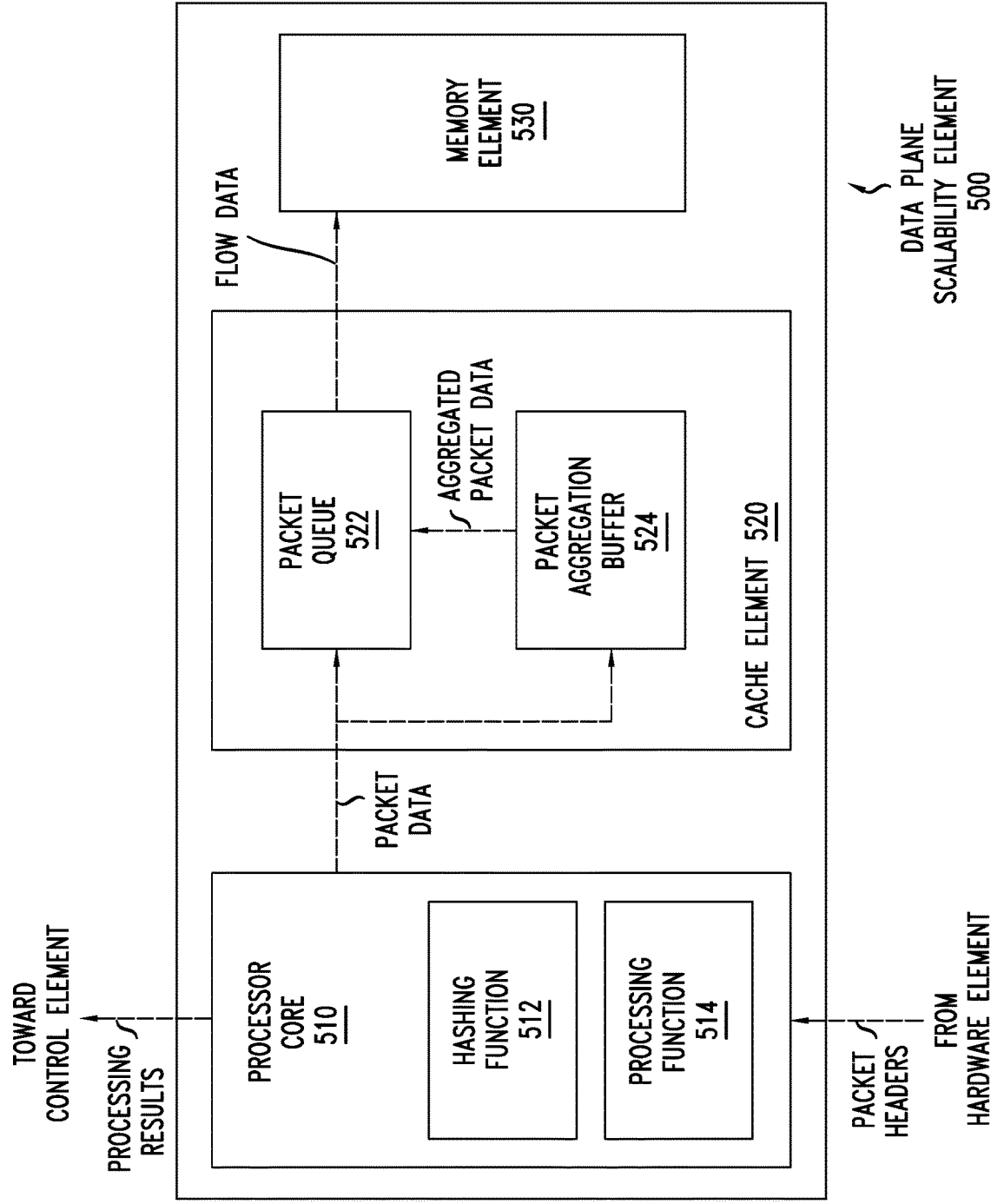
FIG. 5 depicts an embodiment of a data plane scalability element for use in the data plane of FIG. 3 or FIG. 4.

FIG. 5 depicts an embodiment of a data plane scalability element for use in the data plane of FIG. 3 or FIG. 4. The data plane scalability element 500 may be used as data plane scalability element 320 of FIG. 3 or data plane scalability element 431 of FIG. 4.

The data plane scalability element 500 of FIG. 5 includes a processor core 510, a cache element 520, and a memory element 530. It is noted that communication between the various components of the data plane scalability element 500 may be provided in various ways (e.g., communication between processor core 510 and memory element 530 via cache element 520, using one or more communication buses, or the like) and, therefore, is omitted from FIG. 5 for purposes of clarity.

The processor core 510 is configured to support various processing functions of the data plane scalability element 500. The processor core 510 is configured to support a hashing function 512 and a packet processing function 514. The processor core 510 may be configured to support various other processing functions (omitted from FIG. 5 for purposes of clarity).

The cache element 520 is configured to store packet data for packets of packet headers received by processor core 510. The packet data stored by cache element 520 is stored while awaiting processing by processor core 510 for updating flow data stored by memory element 530 as discussed further below. The cache element 520 is configured to support a packet queue 522 and a packet aggregation buffer 524. The packet queue 522 and the packet aggregation buffer 524 are configured to store packet data associated with packets, and may be referred to as a packet buffer or a packet buffer data structure. The packet queue 522 is configured to store individual packet data for individual packets and the packet aggregation buffer 524 is configured to store aggregated packet data for groups of packets on a per-flow basis. The packet queue 522 and the packet aggregation buffer 524 may store packet data using a packet data structure that may be inserted as a packet data entry within the cache element 520 (illustratively, within packet queue 522 or packet aggregation buffer 524). The packet data structure includes a flow identifier element and a packet data element. The flow identifier element identifies the flow with which packet data is associated. The flow identifier element may include one or more fields storing the set of packet header fields which define the flow with which the packet data is associated. The packet data element may include one or more fields storing the packet data of the flow (again, individual packet data of individual data packets for packet data entries of the packet queue 522 and aggregated packet data of aggregated packet data for packet data entries of the packet aggregation buffer 524). The packet data of the packet data element may include statistics (e.g., packet counts, byte counts, bit counts), state information (e.g., TCP state for the flow (e.g., SYN only, SYN-ACK sent, or fully established)), or the like, as well as various combinations thereof. The packet data of the packet data element may vary for different types of processing functions supported by the data plane scalability element 500 (e.g., charging-related data (e.g., packet counts, byte counts, bit counts, or the like), monitoring-related data, security-related data, or the like). The cache element 520 may include a Level 1 (L1) cache, a Level 2 (L2) cache, an L1/L2 cache, or the like.

The memory element 530 is configured to store flow data. The flow data includes data produced based on processing, by processor core 510, of packet data of cache element 520 (e.g., updating per-flow flow data of flows based on processing of packet data maintained by cache element 520). The memory element 530 is configured to store flow data of data flows on a per-flow basis. The memory element 530 is configured to store flow data of packet flows using a flow data structure that may be inserted as a flow data entry within memory element 530. The flow data structure used by memory element 530 to store flow data may be similar to the packet data structure used by cache element 520 to store packet data. The flow data structure includes a flow identifier element and a flow data element. The flow identifier element may include one or more fields storing the set of packet header fields which define the flow with which flow data is associated. The flow data element may include one or more fields storing the flow data of the flow. The flow data of the flow data element may include statistics (e.g., packet counts, byte counts, bit counts), state information (e.g., TCP state for the flow (e.g., SYN only, SYN-ACK sent, or fully established)), or the like, as well as various combinations thereof. The flow data of the flow data element may vary for different types of processing functions supported by the data plane scalability element 500 (e.g., charging-related data (e.g., packet counts, byte counts, bit counts, or the like), monitoring-related data, security-related data, or the like). The memory element 530 may be a Random Access Memory (RAM), a Dynamic RAM (DRAM), or other suitable type of memory.

The processor core 510 is configured to support packet processing functions.

The processor core 510 receives packet headers from a hardware element of the FE with which data plane scalability element 500 is associated (here the hardware element has been omitted for purposes of clarity).

The processor core 510, for a received packet header of a data packet, hashes the received packet header based on a flow identifier of the data packet (e.g., based on a 4-tuple, a 5-tuple, or the like) using the hashing function 512. The hashing function 512 may be configured to use any suitable hashing technique(s).

The processor core 510 after hashing the packet header, assigns the packet header to a per-flow data bucket of memory element 530 that is used to aggregate and store flow data for the flow to which the data packet belongs and identifies the memory address of the per-flow data bucket of memory element 530 that is to be used to aggregate and store the flow data for the flow to which the data packet belongs.

The processor core 510, after hashing the packet header, determines the packet data for the data packet and inserts the packet data for the data packet into the cache element 520. The processor core 510 inserts the packet data for the data packet into the packet queue 522 as long as there is room for the packet data in the packet queue 522, otherwise the processor core 510 inserts the packet data for the data packet into packet aggregation buffer 524. The determination as to whether there is room for the packet data in the packet queue 522 may be based on a determination as to whether the packet queue 522 satisfies or exceeds a threshold (e.g., a size threshold in terms of a total amount of data stored, a number of packet data entries, or the like).

The processor core 510 inserts packet data for data packets into the packet queue 522 as individual packet data entries including individual packet data for the data packets, respectively. The packet queue 522 stores individual packet data for individual data packets for which the packet headers have been received by the processor core 510 but for which the processor core 510 has not yet processed the packet headers of the data packets for updating the flow data of the respective flows to which the data packets belong. The processor core 510 inserts packet data for a data packet into the packet queue 522 as a packet data entry using the packet data structure that is supported by packet queue 522 and packet aggregation buffer 524. The packet data structure, as discussed above, includes a flow identifier element (identifying the flow with which packet data is associated) and a packet data element (including the individual packet data of the data packet).

The processor core 510 inserts packet data for data packets into the packet aggregation buffer 524 as per-flow packet data entries including aggregated packet data for groups of data packets of the flows, respectively. The packet aggregation buffer 524 stores aggregated packet data for groups of data packets of packet flows for which the packet headers have been received by processor core 510 but for which processor core 510 has not yet processed the packet headers of the data packets for updating the flow data of the respective flows with which the groups of data packets are associated (e.g., aggregated packet data for data packets of a first flow is stored using a first packet data structure that provides a first packet data entry of packet aggregation buffer 524, aggregated packet data for data packets of a second flow is stored using a second packet data structure that provides a second packet data entry packet aggregation buffer 524, and so forth). The processor core 510 inserts packet data for a data packet into the packet aggregation buffer 524 by identifying the flow with which the data packet is associated, determining whether a packet data entry already exists in the packet aggregation buffer 524 for the flow (e.g., searching the packet aggregation buffer 524 based on the flow identifier of the flow), and updating the packet aggregation buffer 524 to include the packet data of the data packet based on a result of the determination as to whether a packet data entry already exists in the packet aggregation buffer 524 for the flow. If a packet data entry does not already exists in the packet aggregation buffer 524 for the flow, processor core 510 creates a new packet data entry in the packet aggregation buffer 524 for the flow and stores the packet data of the data packet in the new packet data entry (e.g., using the packet data structure that is supported by the packet aggregation buffer 524, which includes a flow identifier element (identifying the flow with which the data packet is associated) and a packet data element (including the individual packet data of the data packet)). If a packet data entry already exists in the packet aggregation buffer 524 for the flow, processor core 510 updates the existing packet data entry in the packet aggregation buffer 524 based on the packet data of the data packet (e.g., by aggregating the packet statistics of the data packet and the existing packet statistics of the existing packet data entry in the packet aggregation buffer 524, by adding additional flow state information of the data packet to existing flow state information of the existing packet data entry in the packet aggregation buffer 524, or the like). For example, where the aggregated packet statistics for the flow are tracking a total number of bytes received for the flow and a first packet of the flow included 100 bytes and the currently received packet of the flow includes 200 bytes, the existing packet data entry in the packet aggregation buffer 524 is updated to include an aggregated packet statistic indicative that, for data packets for which packet data is maintained in packet aggregation buffer 524, a total of 300 bytes have been received for the flow. If a packet data entry already exists in the packet aggregation buffer 524 for the flow, the processor core 510 may update the existing packet data entry in the packet aggregation buffer 524 for the flow based on the data packet by (1) reading, from packet aggregation buffer 524, the existing flow data for the flow with which the data packet is associated (e.g., based on the flow identifier of the flow), (2) updating the existing packet data for the flow, based on the packet data of the data packet, to form aggregated packet data for the flow, and (3) writing the aggregated packet data for the flow to the packet aggregation buffer 524.

The processor core 510 inserts packet data for packets into the cache element 520 such that the packet queue 522 may have multiple packet data entries/structures for the same flow (since packets that are directed to packet queue 522 are handled individually), whereas the packet aggregation buffer 524 includes a single packet data entry/structure for each flow (since the processor core 510 performs packet data aggregation on a per-flow basis for packet headers directed to the packet aggregation buffer 524).

The processor core 510 may be configured to move aggregated packet data out of the packet aggregation buffer 524 and into the packet queue 522 (since, as discussed further below, updating of the flow data of the memory element 530 may be performed based on processing of packet data entries in packet queue 522). The processor core 510 may move aggregated packet data out of the packet aggregation buffer 524 and into the packet queue 522 based on various conditions. The processor core 510 may move aggregated packet data of a given flow out of the packet aggregation buffer 524 and into the packet queue 522 based on a determination that a condition is satisfied for the given flow. In the case of charging, for example, the condition for the flow may be that the current credit count for the flow satisfies a threshold (e.g., is close to being zero or expiring, has reached zero or expired, or the like). The processor core 510 may move aggregated packet data of flows out of the packet aggregation buffer 524 and into the packet queue 522 based on prioritization of the flows. The processor core 510 may move aggregated packet data of flows out of the packet aggregation buffer 524 and into the packet queue 522 by marking flows of the packet aggregation buffer 524 as urgent (e.g., each of the flows satisfying a condition is marked as urgent), prioritizing the urgent flows with respect to each other (e.g., by assigning respective rank values to the urgent flows), and moving aggregated packet data of urgent flows out of the packet aggregation buffer 524 and into the packet queue 522 based on the prioritization of the urgent flows with respect to each other (e.g., at the time at which aggregated packet data of a flow is to be moved a highest-priority urgent flow is selected as the urgent flow for which aggregated packet data is moved). In other words, the urgent flows receive expedited treatment as compared with flows that are not marked as urgent. The processor core 510 may prioritize the urgent flows based on one or more factors. In the case of charging, for example, a flow marked as urgent may be assigned a rank that is proportional to the number of remaining credits of the flow (e.g., lower credits corresponds to higher rank and, thus, urgency). In the case of monitoring, for example, a flow marked as urgent may be assigned a rank that is proportional to their size. In the case of security, for example, a flow marked as urgent may be assigned a rank that is proportional to the time when the flow was initiated (e.g., when a SYN packet was received for the flow, if it is a half open TCP flow). In at least some embodiments, one or more other factors may be used in determining which flows are marked as urgent or prioritizing urgent flows with respect to each other (e.g., the amount of aggregated packet data accumulated for the flow in the packet aggregation buffer 524, a level of service or priority associated with the flow, or the like, as well as various combinations thereof). The processor core 510 may move aggregated packet data of a given flow out of the packet aggregation buffer 524 and into the packet queue 522 based on a determination that sufficient space has become available within packet queue 522. The processor core 510 may move aggregated packet data of a given flow out of the packet aggregation buffer 524 and into the packet queue 522 by removing the packet data structure from the packet aggregation buffer 524 and inserting the packet data structure into the packet queue 522.

The processor core 510 processes packet data of the cache element 520 for updating the flow data of the memory element 530. The processor core 510 processes packet data of packet queue 522 for updating the flow data of the memory element 530. The processor core 510 may process the packet data of packet queue 522, for updating the flow data of the memory element 530, by processing the packet data entries of the packet queue 522 in a first-in-first-out (FIFO) manner or in any other suitable manner. It will be appreciated that a given packet data entry of packet queue 522 may include packet data for an individual packet (where the packet data was inserted into packet queue 522 directly) or aggregated packet data for a group of packets (where the packet data was aggregated within packet aggregation buffer 524 before being transferred from packet aggregation buffer 524 to the packet queue 522). The processor core 510 may process the packet data entries of packet queue 522 using packet processing function 514, where the functions supported by packet processing function 514 (and, therefore, provided by the processor core 510) may vary for different types of processing functions which may be supported by the forwarding element. The processor core 510 may process a packet data entry of packet queue 522 that is associated with a flow, for updating the flow data maintained within memory element 530 for the flow, by (1) reading, from memory element 530, the existing flow data for the flow with which the packet data entry is associated (e.g., based on the hashed address of memory element 530 that is computed during hashing), (2) updating the existing flow data for the flow, based on the packet data of the packet data entry of the packet queue 522 that is being processed, to form updated flow data for the flow, and (3) writing the updated flow data for the flow to memory element 530 (e.g., based on the hashed address of memory element 530 that is computed during hashing).

The processor core 510 may perform various types of processing for determining the updated flow data for the flow based on the existing flow data for the flow and the packet data of the packet data entry being processed, which may vary for different types of processing functions being provided by the data plane scalability element 500. For example, where the data plane scalability element 500 is providing charging functions, processing for determining the updated flow data for the flow may include updating a packet count or byte count for the flow for use in additional charging computations which may be performed in determining charging information for the customer with which the flow is associated. For example, where the data plane scalability element 500 is providing monitoring functions, processing for determining the updated flow data for the flow may include computing average bandwidth. For example, where the data plane scalability element 500 is providing security functions, processing for determining the updated flow data for the flow may include computing the TCP state for the flow (e.g., SYN only, SYN-ACK sent, or fully established). It will be appreciated that various other types of flow data (e.g., statistics, state information, or the like) may be maintained for various other types of processing functions which may be supported.

The processor core 510 may perform various additional types of processing in conjunction with the processing performed for determining the updated flow data for the flow, which may vary for different types of processing functions being provided by data plane scalability element 500. For example, where the data plane scalability element 500 is providing charging functions, the additional processing may include analyzing the updated flow statistics (e.g., packet count, byte count, or the like) to determine whether to perform additional processing (e.g., based on a determination that a threshold is satisfied or exceeded for a flow, based on a determination that credits allocated to a flow have been used, or the like). For example, where the data plane scalability element 500 is providing charging functions, the additional processing may include communicating with the hardware element of the FE with which processor core 510 is associated (e.g., for setting or modifying flow table entries in the hardware element of the FE with which processor core 510 is associated (e.g., setting a blocking rule for blocking flows within no additional credits, setting a QoS modification rule for modifying the QoS for flows, or the like)). For example, where the data plane scalability element 500 is providing charging functions, the additional processing may include communicating with the CE with which the processor core 510 is associated (e.g., for acquiring and returning allocations of credits, for reporting flow statistics (e.g., periodically, responsive to requests from the CE, or the like), or the like). For example, where the data plane scalability element 500 is providing charging functions, additional processing may include reporting functions (e.g., reporting byte, packet, and usage duration, at as low as per-flow granularity, separately on the uplink and downlink), admission/throttling functions (e.g., allowing/throttling flows up to a byte threshold (for on-line charging), allowing flows for a specified time duration or up to a specified time-of-day, or the like), support credit-based charging functions or similar or associated functions (e.g., blocking flows with no credit, lowering the QoS for flows exceeding their credit, modifying the charging rate (e.g., overage) when usage exceeds the current data bucket, requesting additional credit upon threshold crossings, or the like), or the like, as well as various combinations thereof. For example, where data plane scalability element 500 is providing monitoring functions, the additional processing may include reporting large flows to the CE. For example, where data plane scalability element 500 is providing security functions, the additional processing may include reporting to the CE the number of half open TCP sessions that are not fully established. It will be appreciated that various other types of additional processing may be performed for various other types of processing functions which may be supported.

It will be appreciated that, although primarily presented with respect to embodiments in which updating of the flow data of the memory element 530 is performed based on processing of packet data entries in packet queue 522 (and, thus, packet data entries of packet aggregation buffer 524 are moved into the packet queue 522), in at least some embodiments updating of the flow data of the memory element 530 may be performed based on processing of packet data entries in packet queue 522 and processing of packet data entries in packet aggregation buffer 524 (i.e., without moving packet data entries of packet aggregation buffer 524 into the packet queue 522). In at least some such embodiments, processor core 510 may be configured to prioritize processing of packet data entries in packet queue 522 and processing of packet data entries in packet aggregation buffer 524 for updating the flow data of the memory element 530.

It will be appreciated that, although primarily presented herein with respect to embodiments in which the data plane scalability element 500 uses cache memory to maintain the packet buffer data structure including the packet queue 522 and the packet aggregation buffer 524, in at least some embodiments at least a portion of the packet buffer data structure (e.g., the packet queue 522, the packet aggregation buffer 524, or both the packet queue 522 and the packet aggregation buffer 524) may be maintained in other types of cache-based storage elements (e.g., in other types of cache memory (e.g., L3 cache memory), in main memory (e.g., in RAM, DRAM, or the like), or the like, as well as various combinations thereof). However, as discussed further below, there may be various advantages or potential advantages associated with use of L1/L2 cache memory, rather than other types of cache memory or main memory, to maintain the packet buffer data structure that includes the packet queue 522 and the packet aggregation buffer 524. For example, the use of L1/L2 caches for packet queue 522 and packet aggregation buffer 524 results in more efficient processing for determining aggregated flow data, as compared with use of DRAM for determining aggregated flow data, since latency to access the packet data from L1/L2 caches is expected to be approximately 5-10 times lower than the latency to access the aggregated flow data from the DRAM. Accordingly, in at least some embodiments, the memory that is allocated for the packet queue 522 and the packet aggregation buffer 524 may be kept small enough such that, to the extent possible, the packet queue 522 and the packet aggregation buffer 524 remained cached in the faster L1/L2 cache of the processor and, thus, may be accessed with relatively low latency as compared with many other types of memory (e.g., L3 caches, DRAM, and the like). In at least some embodiments, the memory of cache element 520 that is allocated for the packet queue 522 and the packet aggregation buffer 524 may be allocated statically. In at least some embodiments, the packet aggregation buffer 524 may grow dynamically (e.g., where unprocessed packets overflow, or are in danger of overflowing, the statically allocated memory). It is noted that (1) as long as the data plane scalability element 500 is dimensioned to ensure that the average packet processing rate is higher than the average packet arrival rate, a relatively small packet queue 522 (e.g., 100 packets, 150 packets, or the like) may be sufficient to store the packet data for the arriving packets while the packet data of the arriving packets is awaiting processing for updating associated flow data and (2) since traffic bursts may still cause overflows of packet queue 522 for short periods of time, the packet aggregation buffer 524 may handle any such overflows by, as described above, temporarily aggregating packet data until the aggregated packet data can be used to update the flow data in memory element 530). As a result, caching of packet aggregation buffer 524 (e.g., in faster cache memory, such as in the L1/L2 cache memory of the processor) enables the per-packet processing/aggregation rates to be much higher, thereby providing the necessary speedup to handle traffic bursts. The various benefits or potential benefits of caching the packet buffer data structure may be further understood from the following examples.

As an example, where the cache element 520 is implemented using L1/L2 caches and the memory element 530 is implemented using DRAM, it may be shown that partial aggregation of packet data using packet aggregation buffer 524 before updating flow data in memory element 530 is more efficient than updating flow data in memory element 530 responsive to each data packet. For example, where a flow includes 20 packets, instead of performing 20 individual updates to the flow data of the flow in DRAM via the packet queue 522, it is more efficient to perform a first partial aggregation of packet data of the first 10 packets using the packet aggregation buffer 524 and update the flow data of the flow in DRAM based on that first partial aggregation and then perform a second partial aggregation of packet data of the last 10 packets using the packet aggregation buffer 524 and update the flow data of the flow in DRAM based on the second partial aggregation. This provides a significant increase in processing speed that enables the FE to handle temporary packet bursts without dropping packets.

As an example, where the cache element 520 is implemented using L1/L2 caches and the memory element 530 is implemented using DRAM, it may be shown that a single processor core with a single DRAM bank may support charging at a 10 Gbps line rate with a peak of 100K concurrent flows. In this example, an average packet size of 250 bytes is assumed and an average packet header size of 50 bytes is assumed. This gives a processing rate of 5M packets per second and a 2 Gbps bandwidth needed on the PCI bus in order to stream packets from the ASIC to the CPU (it is noted that PCIe 3.0 has a per-lane throughput of 6 Gbps). As discussed above, updating per-per-flow data requires 2 DRAM accesses and, thus, 10M DRAM accesses per second. It is assumed that the DRAM access is 50 ns, thereby allowing 20M DRAM accesses per second. Accordingly, the processing at line rate should be feasible with a single processor core and DRAM, when the charging processing is performed in forwarding elements (e.g., BTS switches or other types of elements) where the line rate is below 10 Gbps.

It will be appreciated that, although primarily presented herein with respect to embodiments in which the data plane scalability element 500 uses a single processor (e.g., a single core CPU) and a single associated memory element (e.g., a single DRAM), the data plane scalability element 500 may be configured to use multiple processors (e.g., a multi-core CPU, multiple CPUs, or the like, as well as various combinations thereof), multiple memory elements (e.g., multiple dedicated DRAM memory modules associated with multiple processors, respectively), or the like, as well as various combinations thereof. This may allow the data plane scalability element 500 to support processing functions at higher line rates. The data plane scalability element 500 may distribute the packet headers across the multiple processors by hashing the packet header field values and utilizing hash-based load balancing, as hashing is expected to ensure that all packets of the same flow are directed to the same processor/DRAM. It is noted that having a sufficient number of processors and associated DRAM memory modules can ensure that processing can be handled at line rate, even at network elements expected to have relatively high processing rates (e.g., mobile gateways which may support processing rates of 100 Gbps or higher). It will be appreciated that, although primarily presented herein with respect to embodiments in which the data plane scalability element 500 uses a single cache element (illustratively, cache element 520), the data plane scalability element 500 may be configured to use multiple cache elements. It will be appreciated that various storage elements depicted and described herein (e.g., cache element 520, memory element 530, or the like) may be referred to more generally herein as storage elements. It will be appreciated that the various storage element depicted and described herein (e.g., cache element 520, memory element 530, or the like) may be provided using a single storage element, multiple storage elements, or the like.

Figure 6:
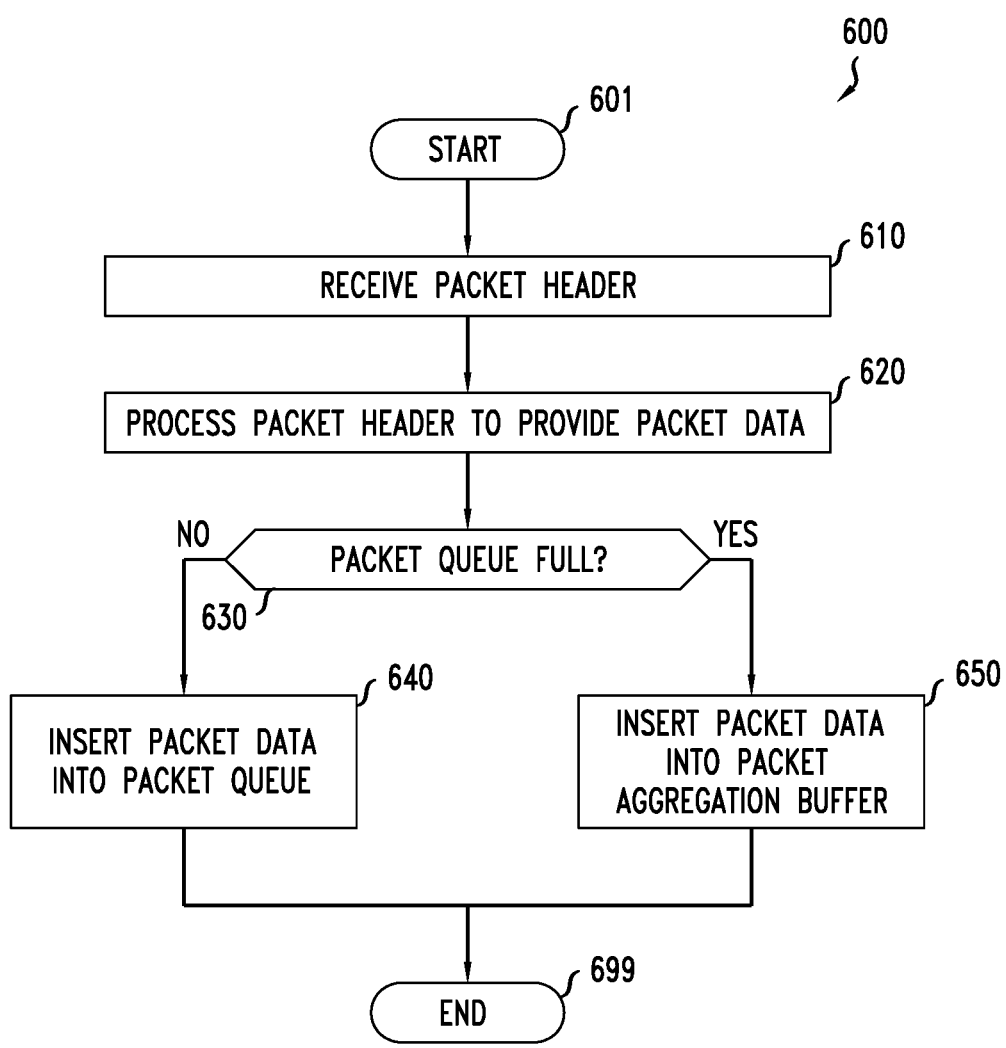
FIG. 6 depicts an embodiment of a method for use by a data plane scalability element in generating and storing packet data for processing by the data plane scalability element.

FIG. 6 depicts an embodiment of a method for use by a data plane scalability element in generating and storing packet data for processing by the data plane scalability element. It will be appreciated that, although primarily presented as being performed serially, at least a portion of the steps of method 600 may be performed contemporaneously or in a different order than as presented in FIG. 6. At step 601, method 600 begins. At step 610, a packet header is received. The packet header may be an uncompressed packet header or may be a compressed packet header (in which case the compressed packet header is uncompressed before further processing is performed). At step 620, the packet header is processed to provide packet data for the packet. The packet data may include a flow identifier of the flow to which the packet belongs and packet data of the packet. At step 630, a determination is made as to whether the packet queue of the data plane scalability element exceeds a threshold (e.g., a size threshold in terms of a total amount of data stored, a number of packet data entries, or the like). If the packet queue of the data plane scalability element does not exceed the threshold, method 600 proceeds to step 640, at which point the packet data is inserted into the packet queue, as individual packet data for the packet, using a packet data entry of the packet queue. If the packet queue of the data plane scalability element exceeds the threshold, method 600 proceeds to step 650, at which point the packet data is inserted into a packet aggregation buffer of the data plane scalability element, as aggregated packet data for the data flow with which the packet is associated, using a packet data entry of the packet aggregation buffer (e.g., as a new packet data entry or via an update of an existing packet data entry). The packet data is then available within the data plane scalability element for later processing to update flow data that is maintained by the data plane scalability element, embodiments of which are presented with respect to FIG. 7. From steps 640 and 650, method 600 proceeds to step 699, at which point the method 600 ends. The steps of method 600 may be further understood by way of reference to FIG. 5.

Figure 7:
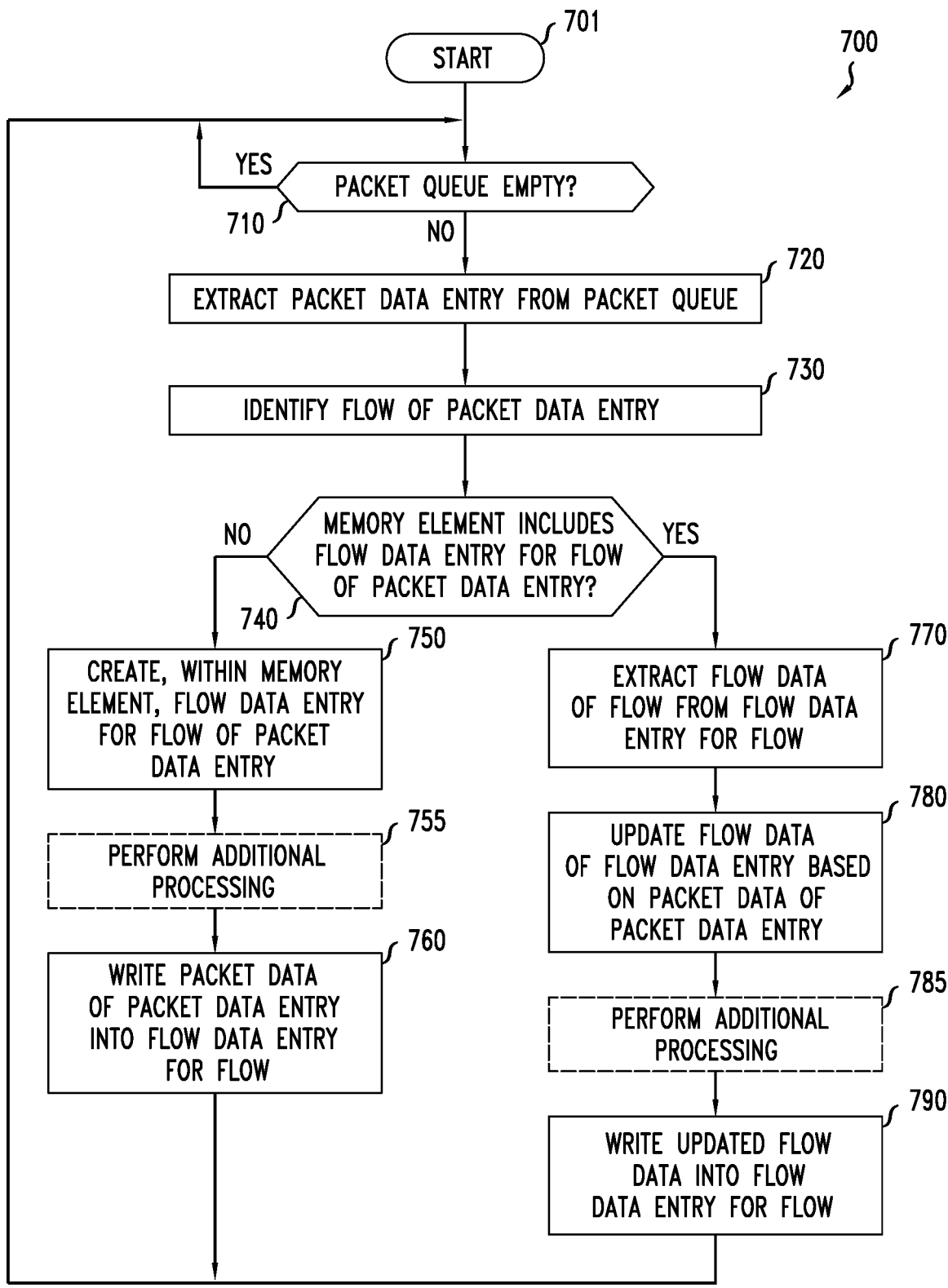
FIG. 7 depicts an embodiment of a method for use by a data plane scalability element in processing packet data to update flow data stored by the data plane scalability element.

FIG. 7 depicts an embodiment of a method for use by a data plane scalability element in processing packet data to update flow data stored by the data plane scalability element. It will be appreciated that, although primarily presented as being performed serially, at least a portion of the steps of method 700 may be performed contemporaneously or in a different order than as presented in FIG. 7.

At step 701, method 700 begins.

At step 710, a determination is made as to whether the packet queue is empty. If the packet queue is empty, method 700 remains at step 710 (until there is packet data in the packet queue that is available for processing). If the packet queue is not empty (it includes a least one packet data entry available for processing), method 700 proceeds to step 720.

At step 720, a packet data entry is extracted from the packet queue. The packet data entry includes packet data including a flow identifier of the flow with which the packet data is associated and packet data. The packet data entry may include individual packet data for a single data packet of the flow (e.g., a packet data entry initially inserted into the packet queue) or aggregated packet data for a set of data packets of the flow (e.g., a packet data entry moved from a packet aggregation buffer into the packet queue). The packet data entry is extracted for processing the packet data of the packet data entry to update flow data of the flow with which the packet data entry is associated. For example, the packet data entry at the front of the packet queue may be extracted for processing.

At step 730, the flow with which the packet data entry is associated is identified. The flow with which the packet data entry is associated may be identified based on the flow identifier of the packet data of the packet data entry.

At step 740, a determination is made as to whether the memory element includes a flow data entry for the flow with which the packet data entry is associated. The determination may be made by searching the memory element using the flow identifier of the packet data entry.

If a determination is made that the memory element does not include a flow data entry for the flow with which the packet data entry is associated, method 700 proceeds to step 750. At step 750, a flow data entry is created within the memory element for the flow with which the packet data entry is associated. At step 755 (an optional step), additional processing may be performed based on the packet data entry before the packet data of the packet data entry are written into the flow data entry. At step 760, the packet data of the packet data entry are written into the flow data entry created within the memory element for the flow with which the packet data entry is associated. From step 760, method 700 returns to step 710.

If a determination is made that the memory element does include an existing flow data entry for the flow with which the packet data entry is associated, method 700 proceeds to step 770. At step 770, flow data of the flow is extracted from the existing flow data entry for the flow with which the packet data entry is associated. This may include extracting the existing flow data entry or only extracting the flow data portion of the existing flow data entry. At step 780, the flow data of the existing flow data entry is updated based on the packet data of the packet data entry to form updated flow data. At step 785 (an optional step), additional processing may be performed based on the updated flow data before the updated flow data is written back into the flow data entry. At step 790, the updated flow data is written back into the flow data entry for the flow with which the packet data entry is associated. From step 790, method 700 returns to step 710.

It will be appreciated that the steps of method 700 may be further understood by way of reference to FIG. 5.

As discussed herein, various types of processing functions may be supported within wireless communication networks. For example, processing functions which may be supported within wireless communication networks may include charging functions, monitoring functions, security functions, or the like, as well as various combinations thereof. The processing function(s) supported within wireless communication networks may include a data plane portion and a control plane portion, each of which may be implemented in various ways. For example, the data plane portion of a processing function of a wireless communication network may be implemented within the hardware of the FE. For example, as depicted and described with respect to FIGS. 1-7, the data plane portion of a processing function of a wireless communication network may be implemented using a data plane scalability element (e.g., a modified version of the CPU of the FE, an adjunct element that is associated with the FE, or the like, as well as various combinations thereof). In general, the deployment of processing functions in a wireless communication network, including the deployment of the data plane and control plane portions of the processing functions, may be implemented in various ways (e.g., using a centralized or distributed deployment). It will be appreciated that separation of the data plane and control plane portions of the processing functions (and, in particular, use of embodiments of the data plane scalability element for the data plane portion of processing functions) may provide greater flexibility in the deployment of the processing functions in a wireless communication network. The distributed deployment of a processing function, including the distributed deployment of the data plane portion of the processing function, in a wireless communication network may be implemented in various ways (again, use of embodiments of the data plane scalability element for the data plane portion of processing functions may provide greater flexibility in this regard). The distributed deployment of the data plane portion of a processing function in a wireless communication network may be further understood by considering distributed deployment of a specific processing function in a wireless communication network. Accordingly, the distributed deployment of the data plane portion of a processing function in a wireless communication network is primarily presented herein within the context of a charging function for the wireless communication network; however, it will be appreciated that embodiments of distributed deployment of the data plane portion of the charging function may be used or adapted for use in providing distributed deployment of the data plane portion of various other types of processing functions which may be implemented within in a wireless communication network (e.g., monitoring, security, or the like). It is noted that distributed deployment of the data plane portion of the charging function (and, thus, other types of functions as well) may or may not utilize embodiments of the data plane scalability element for the data plane portion of processing functions as depicted and described with respect to FIGS. 1-7.

As discussed herein, deployment of processing functions in a wireless communication network, including deployment of the data plane and control plane of the processing functions, may be implemented in various ways. In general, the data plane portion of processing functions may be implemented in a centralized or distributed manner. In 4G wireless networks, for example, the data plane for charging functions typically resides in the Mobile Gateway (MGW)/Mobile Anchor (MA), although existing 4G wireless networks typically have limited separation between the data plane and control plane for charging functions as the anchor assignment is generally static (e.g., all traffic for the user typically traverses a home anchor such that all charging logic may be executed in a single FE (i.e., the home anchor of the user)). By contrast, in order to handle the expected explosion in traffic that may need to be handled by 5G wireless networks, MAs in 5G wireless networks may be deployed closer to the end wireless devices. The result would be a more distributed architecture in which MAs may be assigned at per-flow granularity (such that traffic of a given user may utilize multiple MAs). As a result, the charging data plane also may be more distributed such that charging data plane functions may be distributed across multiple FEs (e.g., across multiple MAs, across a single MA and multiple BTS switches of multiple BTSs, or the like, as well as various combinations thereof). An exemplary embodiment is depicted in FIG. 8.

Figure 8:
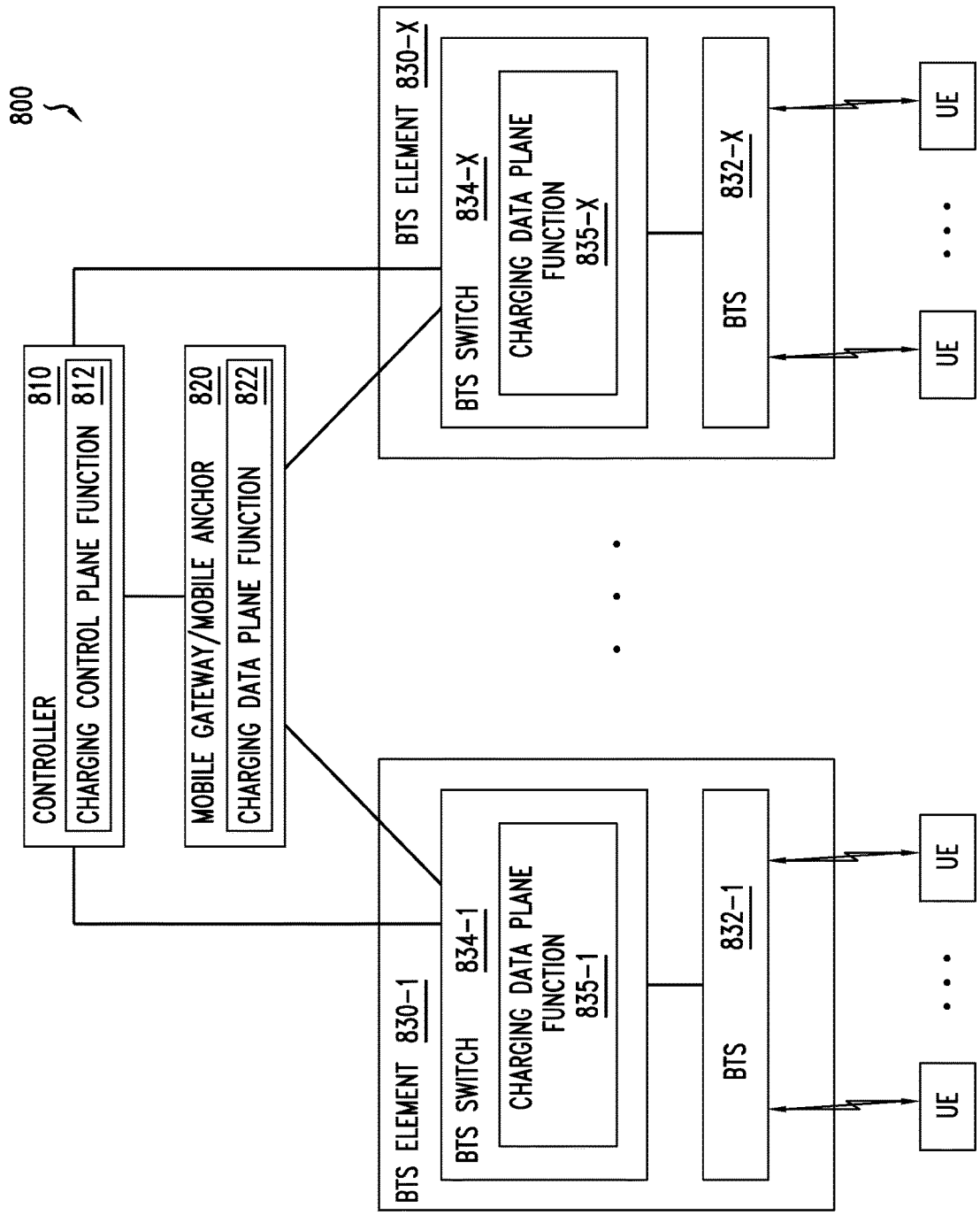
FIG. 8 depicts an embodiment of a wireless communication network supporting a distributed deployment of a charging function for the wireless communication network.

FIG. 8 depicts an embodiment of a wireless communication network supporting a distributed deployment of a charging function for the wireless communication network.

The wireless communication network 800 includes a controller 810, a Mobile Gateway (MGW)/Mobile Anchor (MA) 820, and a plurality of BTS elements 830-1-830-X (collectively, BTS elements 830). The BTS elements 830-1-830-X include BTSs 832-1-832-X (collectively, BTSs 832), respectively, which provide wireless access points for respective sets of UEs. The BTS elements 830-1-830-X include BTS switches 834-1-834-X (collectively, BTS switches 834), respectively, which are configured to facilitate communications between the BTSs 832 and the MGW/MA 820.

The controller 810 may be configured to operate as a control element (CE) for the charging function of the wireless communication network 800 (illustratively, the controller 810 includes charging control plane function 812) and the MGW/MA 820 and the BTS switches 834 may be configured to operate as forwarding elements (FEs) for the charging function of the wireless communication network 800 (illustratively, the MGW/MA 820 includes a data plane charging function 822 and the BTS switches 834-1-834-X include respective data plane charging functions 835-1-835-X (collectively, data plane charging functions 835). The charging control plane function 812 and the charging data plane functions 822 and 835 may cooperate to support the charging of end users of wireless communication network 800 (illustratively, controller 810 is configured to communicate with each of MGW/MA 820 and BTS switches 834). The charging data plane functions 822 and 835 may be implemented as data plane scalability functions depicted and described with respect to FIGS. 1-7.

The controller 810 may be configured to ensure that, in such a distributed charging model, the total data usage of a user, when aggregated across all of the FEs being used by the user (illustratively, BTS switches 834 associated with BTSs 832 via which the user communicates), does not exceed the available credits for the user. In one embodiment, the controller 810 may dynamically divide the available credits of the user and assign the divided credits of the user to the different FEs to be used by the user. The controller 810 may assign the divided credits of the user to the different FEs to be used by the user depending on the data activity from the wireless device(s) of the user (illustratively, one or more of the UEs). The FEs may then perform the processing logic for the user independently. An exemplary message flow for per-user byte count based charging is depicted and described with respect to FIG. 9.

Figure 9:
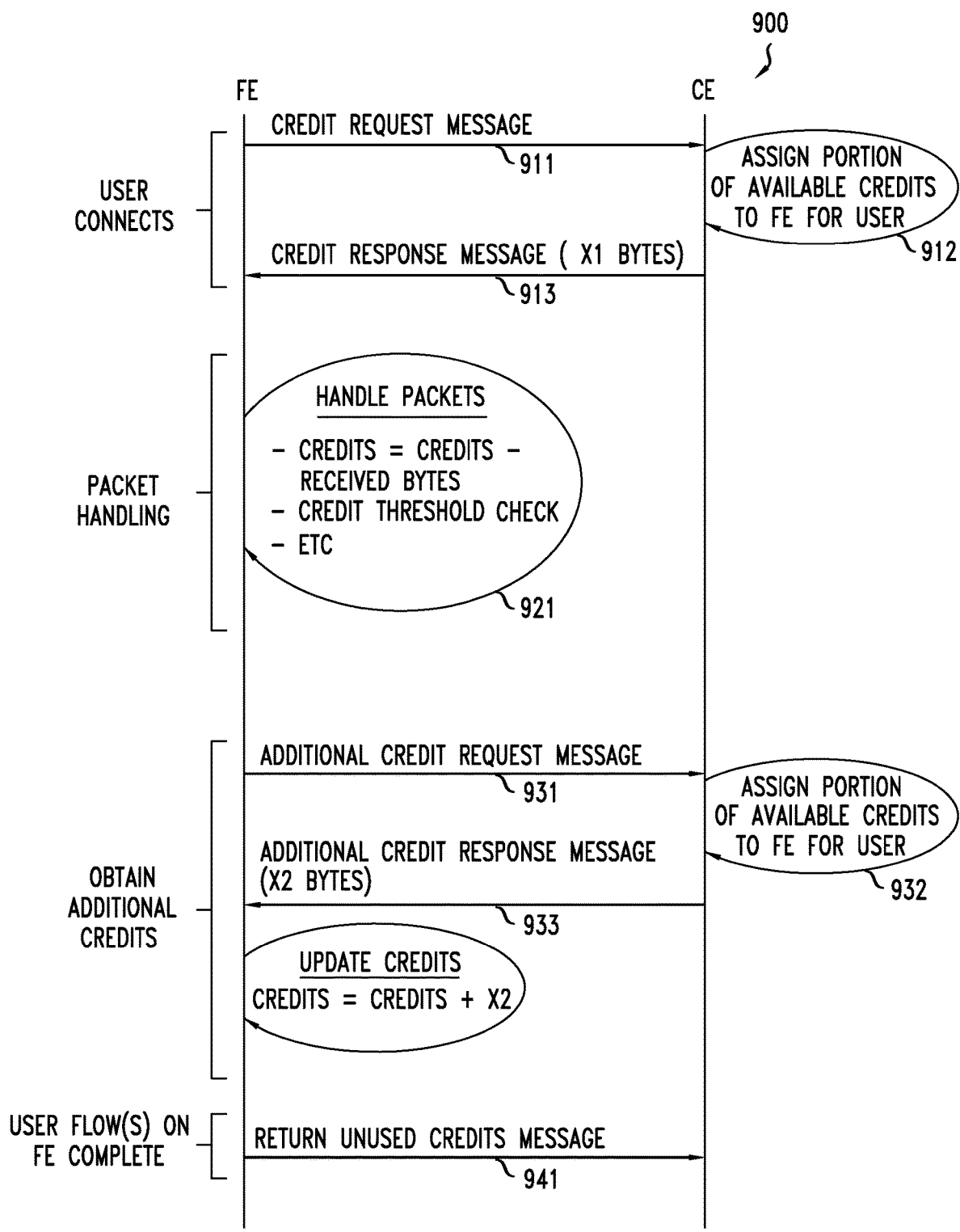
FIG. 9 depicts an embodiment of a message flow for per-user byte-count based charging in a distributed deployment of a charging function for the wireless communication network of FIG. 8.

FIG. 9 depicts an embodiment of a message flow for per-user byte-count based charging in a distributed deployment of a charging function for the wireless communication network of FIG. 8. The message flow 900 of FIG. 9 depicts interaction between a CE providing a control plane for a charging function and an FE providing a data plane for a charging function. For example, message flow 900 of FIG. 9 may be used within the context of wireless communication network 800 of FIG. 8 (e.g., where the CE of FIG. 9 is controller 810 of FIG. 8 and the FE of FIG. 9 is one of the BTS switches 834 of FIG. 8).

As depicted in message flow 900, during a user connection process, the FE sends (911) to the CE a request message in which the FE requests credits for the user, the CE assigns (912) a portion of the available credits of the user to the FE for the user, and the CE sends (913) to the FE a response message in which the CE indicates the number of credits of the user assigned to the FE by the CE (illustratively, the FE is authorized to use X1 credits of the user.

As depicted in message flow 900, during a packet handling process, the FE handles packets of the user (921). The FE, when a packet of the user is received, updates the number of remaining credits available to the user (e.g., by subtracting, from the number of remaining credits available to the user, the number of bytes of the received packet). The FE may then perform various checks related to credit management. The FE may determine whether the number of remaining credits available to the user is zero and, based on a determination that the number of remaining credits available to the user is zero, may set a rule indicative that future packets of the user are to be dropped by the FE (e.g., until the CE authorizes used of additional credits of the user by the FE as discussed further below). The FE may determine whether the number of remaining credits available to the user is below a threshold and, based on a determination that the number of remaining credits available to the user is below a threshold, initiate a new request message in which the FE requests additional credits for the user. As discussed further below, the manner in which the additional available credits of the user are authorized for use by the FE may be similar to the manner in which the initial available credits of the user were authorized for use by the FE at the time that the user connected (discussed above).

As depicted in message flow 900, during an additional credit allocation process, the FE sends (931) to the CE a request message in which the FE requests additional credits for the user, the CE assigns (932) a portion of the available credits of the user to the FE for the user, the CE sends (933) to the FE a response message in which the CE indicates the number of additional credits of the user assigned to the FE by the CE (illustratively, the FE is authorized to use X2 credits of the user), and the FE updates (934) the number of available credits to include the additional credits of the user assigned to the FE by the CE.

As depicted in message flow 900, after the user flows traversing the FE are complete, the FE sends (941) to the CE a return unused credits message in which the FE indicates the number of unused credits of the user that were allocated to, but not used by, the FE for the user (and, accordingly, are being returned by the FE to the CE such that they are available for assignment by the CE for the user in the future).

It will be appreciated that, although primarily presented within the context of a single FE, the CE may be interacting in a similar manner with one or more other FEs which also support flow(s) of the user in order manage the credits of the user across multiple FEs via which the user may communicate.

Figure 10:
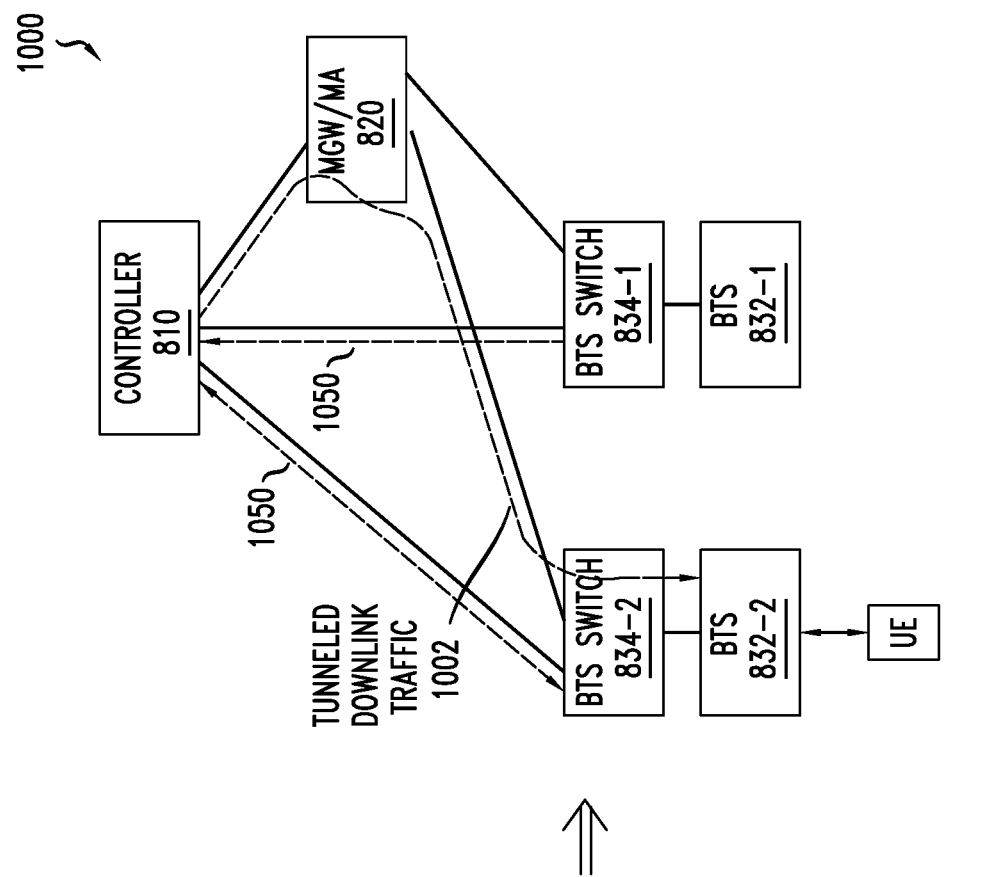
FIG. 10 depicts an embodiment of process for distributed charging for downlink traffic of a user in the exemplary wireless communication network of FIG. 8 when the user moves between wireless access nodes.
Figure 10:
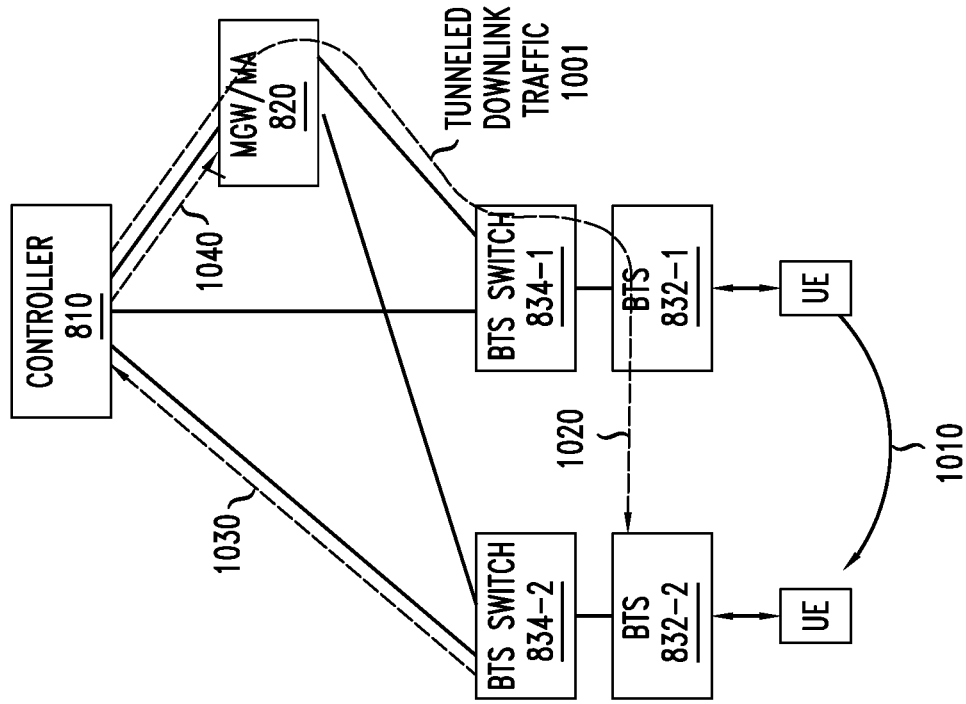

FIG. 10 depicts an embodiment of process for distributed charging for downlink traffic of a user in the exemplary wireless communication network of FIG. 8 when the user moves between wireless access nodes.

As depicted in FIG. 10, the wireless communication network within which the process 1000 is described includes a portion of the wireless communication network 800 depicted and described with respect to FIG. 8. Namely, the wireless communication network depicted in FIG. 10 includes the controller 810, the MGW/MA 820, and a first BTS element 830-1 (including the BTS 832-1 and the BTS switch 834-1) and a second BTS element 830-2 (including the BTS 832-2 and the BTS switch 834-2). The process 1000 is a process for distributed charging for downlink traffic of a user and, thus, a single UE is depicted. The UE is initially associated with BTS 832-1 and then moves to being associated with BTS 832-2.

As depicted in FIG. 10, the process 1000 includes steps performed by nodes of the wireless communication network and also includes signaling between nodes of the wireless communication network. The UE is initially associated with BTS 832-1 and thus, downlink traffic for the UE is initially tunneled from the MGW/MA 820 to the BTS 832-1 and data plane functions supporting charging for the downlink traffic of the user are performed on the BTS switch 834-1. At step 1010, the UE moves from being associated with BTS 832-1 to being associated with BTS 832-2. At step 1020, the downlink traffic for the user is tunneled from the MGW/MA 820 to BTS 832-2 via BTS 832-1 and data plane functions supporting charging for the downlink traffic of the user continue to be performed on the BTS switch 834-1. The tunneling of downlink traffic of the user to BTS 832-2 indirectly via BTS 832-1 is depicted as tunneled downlink traffic 1001. At step 1030, the BTS 832-2 informs the controller 810 that the UE is now associated with the BTS 832-2. At step 1040, the controller 810 updates the MGW/MA 820 to tunnel downlink traffic of the user to BTS 832-2 directly (rather than tunneling downlink traffic of the user to BTS 832-1 and relying on BTS 832-1 to tunnel the downlink traffic of the user to BTS 832-2). The tunneling of downlink traffic of the user to BTS 832-2 directly is depicted as tunneled downlink traffic 1002. At step 1050, the BTS switch 834-2 requests credits for the user, from the controller 810, if the BTS switch 834-2 did not already receive an allocation of credits for the user (e.g., while handling uplink packets for the user). At step 1060, charging responsibility for the user is changed from the BTS switch 834-1 to the BTS switch 834-2. The BTS switch 834-1 terminates downlink charging processing for the user (e.g., after a timeout due to no activity for user traffic of the user, based on a request from the controller 810 or from the BTS switch 834-2, or the like). The BTS switch 834-1 may inform the controller 810 of any leftover credits of the user that were allocated to, but not used by, BTS switch 834-1. The BTS switch 834-2 initiates downlink charging processing for the user.

Figure 11:
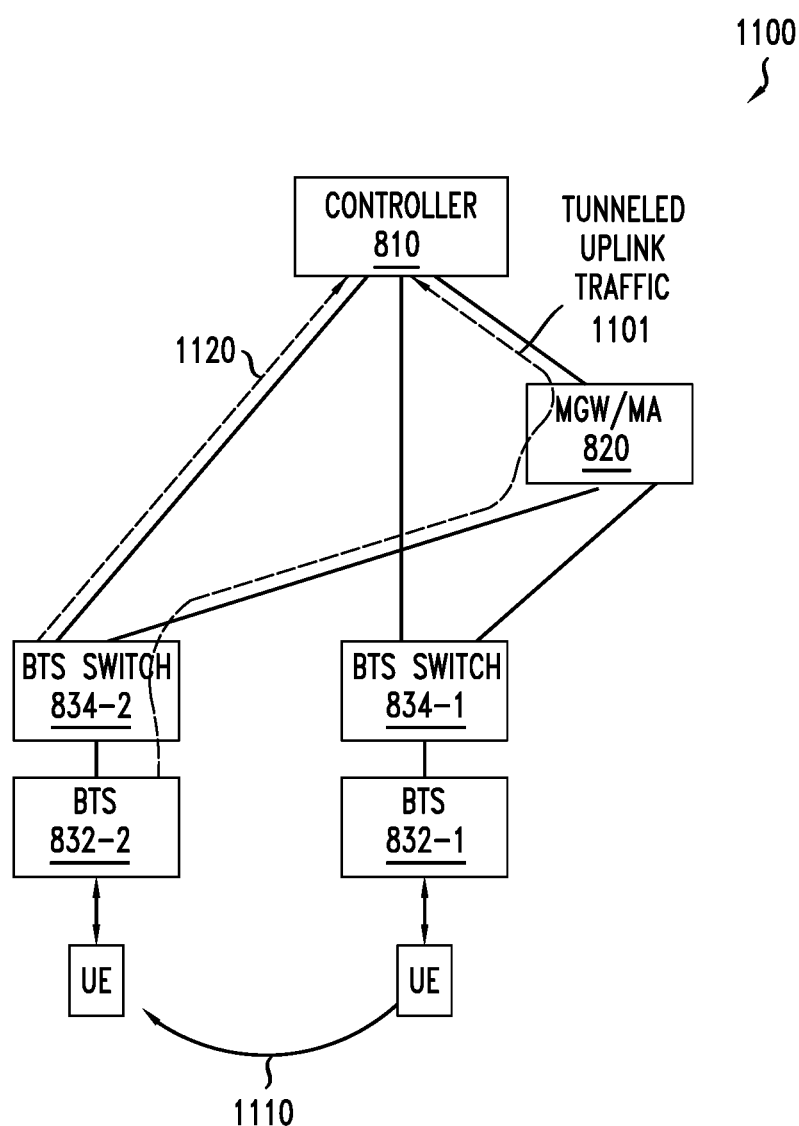
FIG. 11 depicts an embodiment of process for distributed charging for uplink traffic of a user in the exemplary wireless communication network of FIG. 8 when the user moves between wireless access nodes.

FIG. 11 depicts an embodiment of process for distributed charging for uplink traffic of a user in the exemplary wireless communication network of FIG. 8 when the user moves between wireless access nodes.

As depicted in FIG. 11, the wireless communication network within which the process 1100 is described includes a portion of the wireless communication network 800 depicted and described with respect to FIG. 8. Namely, the wireless communication network depicted in FIG. 11 includes the controller 810, the MGW/MA 820, and a first BTS element 830-1 (including the BTS 832-1 and the BTS switch 834-1) and a second BTS element 830-2 (including the BTS 832-2 and the BTS switch 834-2). The process 1100 is a process for distributed charging for uplink traffic of a user and, thus, a single UE is depicted. The UE is initially associated with BTS 832-1 and then moves to BTS 832-2.

As depicted in FIG. 11, the process 1100 includes steps performed by nodes of the wireless communication network and also includes signaling between nodes of the wireless communication network. The UE is initially associated with BTS 832-1 and thus, uplink traffic for the UE is initially tunneled from the BTS 832-1 to the MGW/MA 820 and data plane functions supporting charging for the uplink traffic of the user are performed on the BTS switch 834-1. At step 1110, the UE moves from being associated with BTS 832-1 to being associated with BTS 832-2. As a result, the uplink traffic of the user is tunneled to the MGW/MA 820 from the BTS 832-2 rather than from the BTS 832-1. The tunneling of uplink traffic of the user from the BTS 832-1 to the MGW/MA 820 is depicted as tunneled uplink traffic 1101. At step 1120, the BTS switch 834-2, upon receiving the first uplink packet from the UE, requests credits for the user, from the controller 810, if the BTS switch 834-2 switch did not already receive an allocation of credits of the user (e.g., while handling downlink packets for the user). At step 1130, the BTS switch 834-2 initiates uplink charging processing for the user.

It will be appreciated that, although primarily presented herein with respect to embodiments in which distributed charging is performed on a per-user basis (e.g., as depicted and described in FIGS. 8-11), in at least some embodiments distributed charging may be provided at various other levels of granularity. For example, embodiments of distributed charging presented herein may be adapted to support charging for a group of users. For example, embodiments of distributed charging presented herein may be adapted to support charging for a family plan in which multiple users share a single plan and, thus, all family members will be collectively charged. For example, embodiments of distributed charging presented herein may be adapted to support charging for an M2M plan in which all data usage of all IoT devices of an enterprise may be collectively charged. It will be appreciated that various embodiments of distributed charging presented herein may be adapted to support charging at various other levels of granularity.

It will be appreciated that, although primarily presented herein with respect to embodiments of the scalable data plane in which the processing functions are performed based on packet information at or below the transport layer (e.g., Layer 4 (L4) of the Open Systems Interconnection (OSI) model or L4 of the TCP/IP model), embodiments of the scalable data plane may be used or adapted for use in supporting processing functions operating on information above the transport layer (e.g., Real-Time Transport Protocol (RTP) header information, Hypertext Transport Protocol (HTTP), or the like, as well as various combinations thereof). It will be appreciated that such information above the transport layer may be used to support one or more of the processing functions discussed herein (e.g., information above the transport layer may be particularly useful in providing various types of monitoring or security functions) or various other functions which may be provided within communication networks.

It will be appreciated that, although primarily presented herein with respect to embodiments of the scalable data plane in which the scalable data plane is used to support processing functions in particular types of wireless communication networks (namely, cellular networks), embodiments of the scalable data plane may be used to support processing functions in various other types of wireless communication networks.

It will be appreciated that, although primarily presented herein with respect to embodiments of the scalable data plane in which the scalable data plane is used to support processing functions in particular types of communication networks (namely, wireless communication networks), embodiments of the scalable data plane may be used to support processing functions in various other types of communication networks (e.g., wireline communication networks or the like).

Figure 12:
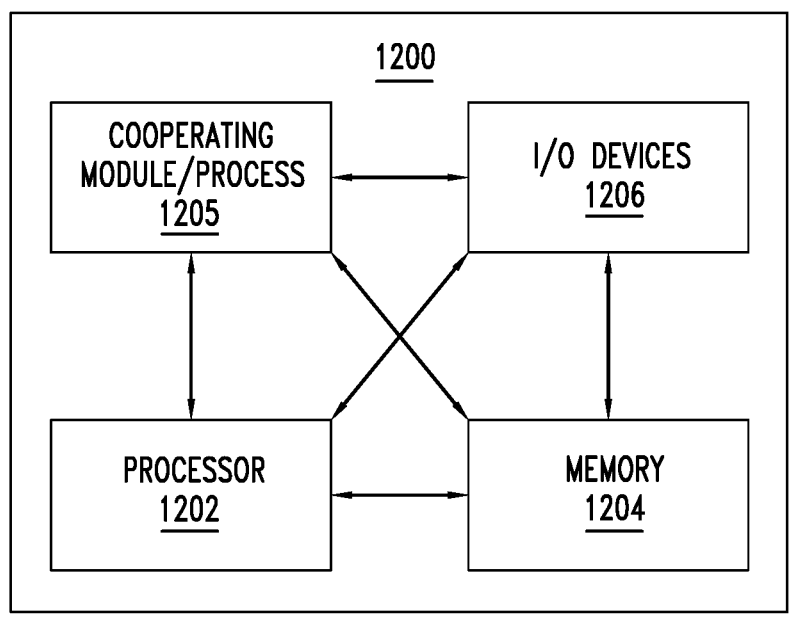
FIG. 12 depicts a high-level block diagram of a computer suitable for use in performing various functions presented herein.

FIG. 12 depicts a high-level block diagram of a computer suitable for use in performing various functions described herein.

The computer 1200 includes a processor 1202 (e.g., a central processing unit (CPU), a processor having a set of processor cores, a processor core of a processor, or the like) and a memory 1204 (e.g., a random access memory (RAM), a read only memory (ROM), or the like). The processor 1202 and the memory 1204 are communicatively connected.

The computer 1200 also may include a cooperating element 1205. The cooperating element 1205 may be a hardware device. The cooperating element 1205 may be a process that can be loaded into the memory 1204 and executed by the processor 1202 to implement functions as discussed herein (in which case, for example, cooperating element 1205 (including associated data structures) can be stored on a computer-readable storage medium, such as a storage device or other storage element (e.g., a magnetic drive, an optical drive, or the like)).

The computer 1200 also may include one or more input/output devices 1206. The input/output devices 1206 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1200 of FIG. 12 may represent a general architecture and functionality suitable for implementing functional elements described herein, portions of functional elements described herein, or the like, as well as various combinations thereof. For example, computer 1200 may provide a general architecture and functionality that is suitable for implementing one or more of a WD 110, a WAN 121, an AN 122, a controller 123, a CE 210, an FE 220, an FE 300, an AE 430, a data plane scalability element 500, or various other elements depicted and described herein.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that at least some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including computer program code;
   wherein the at least one memory and the computer program code are configured to, with the at least one processor, cause the apparatus to at least:
      receive, by a forwarding element (FE) associated with a wireless access device (WAD), downlink traffic intended for a wireless device (WD) associated with the WAD;
      send, by the FE toward a control element (CE) based on handling of the downlink traffic intended for the WD by the FE and based on a determination that the FE did not receive a set of downlink credits for the WD during handling of uplink traffic of the WD by the first FE, a request for a set of downlink credits for the WD;
      receive, by the FE from CE, the set of downlink credits for the WD; and perform, by the FE based on the set of downlink credits for the WD and the downlink traffic intended for the WD, charging processing for the downlink traffic intended for the WD.

2. The apparatus of claim 1, wherein the at least one memory and the computer program code are configured to, with the at least one processor, cause the apparatus to at least:
stop, by the FE after a movement of the WD from being associated with the WAD to being associated with a second WAD, the charging processing for the downlink traffic intended for the WD; and
send, by the FE toward the CE, a set of leftover downlink credits of the WD, from the set of downlink credits for the WD, not used by the WD.

3. The apparatus of claim 2, wherein the charging processing for the downlink traffic intended for the WD is stopped based on a timeout condition.

4. The apparatus of claim 3, wherein the timeout condition is based on a determination that the downlink traffic intended for the WD has not been received by the FE for a threshold length of time.

5. The apparatus of claim 1, wherein the at least one memory and the computer program code are configured to, with the at least one processor, cause the apparatus to at least:
perform, by the FE based on the uplink traffic of the WD, charging processing for the uplink traffic of the WD.

6. The apparatus of claim 1, wherein the WAD comprises a base transceiver station.

7. An apparatus, comprising:
at least one processor; and
at least one memory including computer program code;
wherein the at least one memory and the computer program code are configured to, with the at least one processor, cause the apparatus to at least:
receive, by a first forwarding element (FE) associated with a first wireless access device (WAD) serving a wireless device (WD) based on tunneling from a gateway via a second WAD associated with a second FE, tunneled downlink traffic intended for the WD;
send, by the first FE toward a control element (CE) responsive to receipt of the tunneled downlink traffic intended for the WD and based on a determination that the first FE did not receive a set of downlink credits for the WD during handling of uplink traffic of the WD by the first FE, a request for a set of downlink credits for the WD;
receive, by the first FE from the CE, the set of downlink credits for the WD;
receive, by the first FE from the gateway, downlink traffic intended for the WD; and
perform, by the first FE based on the set of downlink credits for the WD and the downlink traffic intended for the WD, charging processing for the downlink traffic intended for the WD.

8. The apparatus of claim 7, wherein the at least one memory and the computer program code are configured to, with the at least one processor, cause the apparatus to at least:
send, by the first FE toward the CE, an indication of mobility of the WD from being associated with the second FE to being associated with the first FE.

9. The apparatus of claim 7, wherein the at least one memory and the computer program code are configured to, with the at least one processor, cause the apparatus to at least:
send, by the first FE toward the CE, a request for a set of uplink credits for the WD.

10. The apparatus of claim 9, wherein the request for the set of uplink credits for the WD is sent from the first FE toward the CE responsive to handling of the uplink traffic of the WD by the first FE.

11. The apparatus of claim 7, wherein the at least one memory and the computer program code are configured to, with the at least one processor, cause the apparatus to at least:
receive, by the FE from the CE, the set of uplink credits for the WD; and
perform, by the first FE based on the set of uplink credits for the WD and the uplink traffic of the WD, charging processing for the uplink traffic of the WD.

12. The apparatus of claim 7, wherein the first WAD comprises a first base transceiver station and the second WAD comprises a second base transceiver station.

13. An apparatus, comprising:
at least one processor; and
at least one memory including computer program code;
wherein the at least one memory and the computer program code are configured to, with the at least one processor, cause the apparatus to at least:
receive, by a forwarding element (FE) associated with a wireless access device (WAD), uplink traffic of a wireless device (WD) associated with the WAD;
send, by the FE toward a control element (CE) based on handling of the uplink traffic of the WD by the FE and based on a determination that the FE did not receive a set of uplink credits for the WD during handling of downlink traffic intended for the WD by the FE, a request for a set of uplink credits for the WD;
receive, by the FE from the CE, the set of uplink credits for the WD; and
perform, by the FE based on the set of uplink credits for the WD and the uplink traffic of the WD, charging processing for the uplink traffic of the WD.

* * * * *